(12) United States Patent
Sekikawa et al.

(10) Patent No.: US 9,644,046 B2
(45) Date of Patent: May 9, 2017

(54) METHOD FOR PRODUCING MODIFIED CONJUGATED DIENE-BASED POLYMER, MODIFIED CONJUGATED DIENE-BASED POLYMER, AND MODIFIED CONJUGATED DIENE-BASED POLYMER COMPOSITION

(71) Applicant: Asahi Kasei Chemicals Corporation, Tokyo (JP)

(72) Inventors: Shinichi Sekikawa, Tokyo (JP); Junichi Yoshida, Tokyo (JP); Takaaki Matsuda, Tokyo (JP)

(73) Assignee: Asahi Kasei Chemicals Corporation, Tokyo (JP)

(*) Notice: Subject to any disclaimer, the term of this patent is extended or adjusted under 35 U.S.C. 154(b) by 0 days.

(21) Appl. No.: 14/920,320

(22) Filed: Oct. 22, 2015

(65) Prior Publication Data

US 2016/0096909 A1   Apr. 7, 2016

Related U.S. Application Data

(62) Division of application No. 13/639,145, filed as application No. PCT/JP2011/059352 on Apr. 15, 2011, now Pat. No. 9,193,807.

(30) Foreign Application Priority Data

Apr. 16, 2010 (JP) ................. 2010-095310

(51) Int. Cl.
  C08F 8/42 (2006.01)
  C08C 19/44 (2006.01)
  C08K 3/36 (2006.01)

(52) U.S. Cl.
  CPC ............... *C08F 8/42* (2013.01); *C08C 19/44* (2013.01); *C08K 3/36* (2013.01)

(58) Field of Classification Search
  CPC .................................... C08F 8/42; C08K 3/36
  USPC ........................................................ 524/492
  See application file for complete search history.

(56) References Cited

U.S. PATENT DOCUMENTS

| | | | |
|---|---|---|---|
| 3,333,024 A | 7/1967 | Haefele et al. | |
| 4,501,857 A | 2/1985 | Kishimoto et al. | |
| 4,673,714 A | 6/1987 | Kishimoto et al. | |
| 5,010,203 A | 4/1991 | Deschler et al. | |
| 5,508,333 A | 4/1996 | Shimizu | |
| 5,527,753 A | 6/1996 | Engel et al. | |
| 5,708,092 A | 1/1998 | Schwindeman et al. | |
| 2003/0199669 A1 | 10/2003 | Saito et al. | |
| 2004/0178163 A1 | 9/2004 | Kerns et al. | |
| 2004/0254301 A1 | 12/2004 | Tsukimawashi et al. | |
| 2006/0173138 A1 | 8/2006 | Hogan et al. | |
| 2009/0036567 A1 | 2/2009 | Oshima et al. | |
| 2009/0163668 A1 | 6/2009 | Yamada et al. | |
| 2009/0203843 A1 | 8/2009 | Fukuoka et al. | |
| 2009/0292043 A1 | 11/2009 | Kurazumi et al. | |
| 2010/0056710 A1 | 3/2010 | Oshima | |
| 2010/0105826 A1 | 4/2010 | Uesaka | |
| 2010/0152369 A1 | 6/2010 | Shibata et al. | |
| 2011/0146877 A1 | 6/2011 | Tanaka et al. | |
| 2011/0160388 A1 | 6/2011 | Tanaka et al. | |
| 2011/0178233 A1 | 7/2011 | Chaboche et al. | |
| 2014/0371383 A1 | 12/2014 | Hiyata et al. | |

FOREIGN PATENT DOCUMENTS

| | | |
|---|---|---|
| CN | 1894288 A | 1/2007 |
| EP | 2003146 A2 | 12/2008 |
| EP | 2130842 A1 | 12/2009 |
| GB | 1020720 A | 2/1966 |
| GB | 2241239 A | 8/1991 |
| JP | S42-008704 B | 4/1967 |
| JP | S43-006636 B | 3/1968 |

(Continued)

OTHER PUBLICATIONS

JP2009-227858A—machine translation.*
Null, "Safe Process Oils for Tires with Low Environmental Impact," Kautschuk Gummi Kunststoffe, 52: 799-805(1999).
Kolthoff et al., "Determination of Polystyrene in GR-S Rubber," Journal of Polymer Science, 1: 429-433 (1946).
Search Report issued in related International Application No. PCT/JP2010/066431 dated Dec. 21, 2010.
Search Report issued in corresponding International Application No. PCT/JP2011/059352 dated Jul. 19, 2011.
Office Action issued in related U.S. Appl. No. 13/497,575 dated Oct. 7, 2013.

(Continued)

*Primary Examiner* — Ling Choi
*Assistant Examiner* — Ronald Grinsted
(74) *Attorney, Agent, or Firm* — Morgan, Lewis & Bockius LLP

(57) ABSTRACT

A method for producing a modified conjugated diene-based polymer having a good balance between the hysteresis loss properties and the wet skid resistance, practically sufficient abrasion resistance and breaking strength, and high processability when formed into a vulcanized product is provided. A method for producing a modified conjugated diene-based polymer, comprising: a polymerization step of polymerizing a conjugated diene compound, copolymerizing conjugated diene compounds, or copolymerizing a conjugated diene compound with an aromatic vinyl compound using an alkali metal compound or an alkaline earth metal compound as a polymerization initiator to obtain a conjugated diene-based polymer having an active end, and a modifying step of reacting a compound represented by following formula (1) with the active end of the conjugated diene-based copolymer.

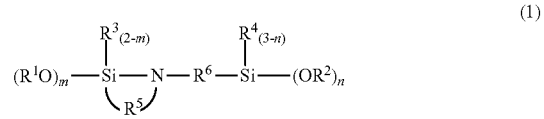

(1)

5 Claims, No Drawings

(56) References Cited

FOREIGN PATENT DOCUMENTS

| | | |
|---|---|---|
| JP | S59-140211 A | 8/1984 |
| JP | S63-004841 B2 | 2/1988 |
| JP | H01-037970 B2 | 8/1989 |
| JP | H01-053851 B2 | 11/1989 |
| JP | H02-009041 B2 | 2/1990 |
| JP | H02-045492 A | 2/1990 |
| JP | H02-132104 A | 5/1990 |
| JP | H07-233217 A | 9/1995 |
| JP | H08-109219 A | 4/1996 |
| JP | H11-189616 A | 7/1999 |
| JP | 2001-158834 A | 6/2001 |
| JP | 2003-171418 A | 6/2003 |
| JP | 2004-067982 A | 3/2004 |
| JP | 2004-182894 A | 7/2004 |
| JP | 2005-232351 A | 9/2005 |
| JP | 2005-290355 A | 10/2005 |
| JP | 2008-143943 A | 6/2008 |
| JP | 2008-527150 A | 7/2008 |
| JP | 2008-285558 A | 11/2008 |
| JP | 2009-227858 A | 10/2009 |
| JP | 2009-242788 A | 10/2009 |
| JP | 2009227858 A * | 10/2009 |
| JP | 2009-263537 A | 11/2009 |
| JP | 2009-263538 A | 11/2009 |
| JP | 2009-280805 A | 12/2009 |
| JP | 2009-287020 A | 12/2009 |
| JP | 2010-132872 A | 6/2010 |
| JP | 2011-518924 A | 6/2011 |
| WO | 01/23467 A1 | 4/2001 |
| WO | 2005/056615 A1 | 6/2005 |
| WO | 2006/076629 A1 | 7/2006 |
| WO | 2006/112450 A1 | 10/2006 |
| WO | 2007/034785 A1 | 3/2007 |
| WO | 2007/114203 A1 | 10/2007 |
| WO | 2008/013090 A1 | 1/2008 |
| WO | 2008/123164 A1 | 10/2008 |
| WO | 2009/133888 A | 11/2009 |

OTHER PUBLICATIONS

Office Action issued in corresponding Chinese Patent Application No. 201180013063.5 dated Jul. 3, 2013.
Search Report issued in corresponding European Patent Application No. 11768946.3 dated Jul. 9, 2013.
Office Action issued in related Japanese Patent Application No. 2012-510704 dated Feb. 3, 2014.

* cited by examiner

METHOD FOR PRODUCING MODIFIED CONJUGATED DIENE-BASED POLYMER, MODIFIED CONJUGATED DIENE-BASED POLYMER, AND MODIFIED CONJUGATED DIENE-BASED POLYMER COMPOSITION

TECHNICAL FIELD

The present invention relates to a method for producing a modified conjugated diene-based polymer, a modified conjugated diene-based polymer, and a modified conjugated diene-based polymer composition.

BACKGROUND ART

Recently, a demand for fuel efficiency in automobiles has been increased, and as a material for tires for automobiles, particularly a material for a tire tread contacting the ground, development of a material having a low rolling resistance has been demanded. On the other hand, from the viewpoint of safety, a material having a high wet skid resistance, and practically sufficient abrasion resistance and breaking properties has been demanded.

Conventionally, as a reinforcing filler for the tire tread, carbon black, silica, and the like have been used. Use of silica has an advantage in the hysteresis loss reduction and the wet skid resistance improvement. However, contrary to carbon black having a hydrophobic surface, silica having a hydrophilic surface has disadvantages such as small affinity with a conjugated diene rubber and dispersibility inferior to that of carbon black. For this reason, a silane coupling agent and the like need to be additionally contained in order to improve dispersibility and bond silica to the rubber.

Further, recently, by introducing a functional group having affinity or reactivity with silica into a chain end of a rubber molecule having high mobility, attempts have been made to improve dispersibility of the silica in a rubber composition, to reduce the mobility of the chain end of the rubber molecule, and further to reduce hysteresis loss.

For example, Patent Document 1 proposes a modified diene rubber obtained by reacting a modifier having a glycidyl amino group with an active polymer end. Patent Documents 2 to 4 propose modified diene rubbers obtained by reacting alkoxysilanes containing an amino group with an active polymer end, and compositions of these modified diene rubbers and silica. Patent Document 5 proposes a polymer functionalized by reacting a cyclic azasilane compound with an active polymer end. Patent Document 6 proposes a diene rubber obtained by a coupling reaction of an active polymer end with a polyfunctional silane compound.

PATENT DOCUMENT

Patent Document 1: International Publication No. WO 01/23467
Patent Document 2: Japanese Patent Laid-Open No. 2005-290355
Patent Document 3: Japanese Patent Laid-Open No. 11-189616
Patent Document 4: Japanese Patent Laid-Open No. 2003-171418
Patent Document 5: National Publication of International Patent Application No. 2008-527150
Patent Document 6: International Publication No. WO 07/114203

SUMMARY OF THE INVENTION

Problems to be Solved by the Invention

In the case where a functional group having a high reactivity with silica is introduced into the chain end, however, the functional group tends to react with silica particles during a kneading step to increase viscosity of the composition, leading to inferior processability such as difficulties to knead the composition and more roughness and breakage of a sheet produced when the sheet is formed after kneading. Moreover, when the composition is formed into a vulcanized product, particularly when the composition is formed into a vulcanized product containing an inorganic filler, a more improved balance between the hysteresis loss properties and the wet skid resistance is demanded.

The present invention has been made in consideration of such circumstances, and an object of the present invention is to provide a method for producing a modified conjugated diene-based polymer, in which the modified conjugated diene-based polymer has a good balance between the hysteresis loss properties and the wet skid resistance, practically sufficient abrasion resistance and breaking strength, and high processability when the modified conjugated diene-based polymer is formed into a vulcanized product.

Means for Solving the Problems

As a result of extensive research in order to solve the problems, the present inventors found out that a method for producing a modified conjugated diene-based polymer can solve the problems above, the method comprising: a polymerization step of polymerizing a conjugated diene compound, copolymerizing conjugated diene compounds, or copolymerizing a conjugated diene compound with an aromatic vinyl compound using an alkali metal compound or an alkaline earth metal compound as a polymerization initiator to obtain a conjugated diene-based polymer having an active end; and a modifying step of reacting a compound having a specific structure with the active end of the conjugated diene-based polymer. Thus, the present invention has been completed.

The present invention is as follows.

[1]

A method for producing a modified conjugated diene-based polymer, comprising:

a polymerization step of polymerizing a conjugated diene compound, copolymerizing conjugated diene compounds, or copolymerizing a conjugated diene compound with an aromatic vinyl compound using an alkali metal compound or an alkaline earth metal compound as a polymerization initiator to obtain a conjugated diene-based polymer having an active end, and a modifying step of reacting a compound represented by following formula (1) with the active end of the conjugated diene-based copolymer:

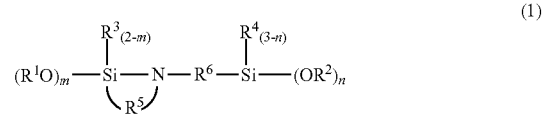

(wherein $R^1$ to $R^4$ each independently represent an alkyl group or aryl group having 1 to 20 carbon atoms; $R^5$ represents an alkylene group having 1 to 10 carbon atoms;

R⁶ represents an alkylene group having 1 to 20 carbon atoms; m is an integer of 1 or 2; and n is an integer of 2 or 3.)

[2]

The method for producing the modified conjugated diene-based polymer according to [1], wherein in formula (1), m is 2, and n is 3.

[3]

The method for producing the modified conjugated diene-based polymer according to [1] or [2], wherein in the modifying step, the compound represented by formula (1) is added within a range in which a total number of moles of the alkoxy group bonded to the silyl group in the compound represented by formula (1) is from 0.6 to 3 times the number of moles of the polymerization initiator.

[4]

A modified conjugated diene-based polymer which comprises two silyl groups having an alkoxy group bonded thereto and which comprises a functional group including a secondary amino group within a molecule, wherein a degree of modification is not less than 50% by mass, the degree of modification being determined by an amount to be adsorbed to a column filled with silica particles by gel permeation chromatography (GPC) measurement using the column.

[5]

The modified conjugated diene-based polymer according to [4], wherein a polystyrene equivalent number average molecular weight (Mn) of the modified conjugated diene-based polymer measured by gel permeation chromatography (GPC) is from 200,000 to 600,000.

[6]

The modified conjugated diene-based polymer according to [4] or [5], wherein when in the modified conjugated diene-based polymer, a ratio (Mw/Mn) of a polystyrene equivalent weight average molecular weight (Mw) to the polystyrene equivalent number average molecular weight (Mn) by gel permeation chromatography (GPC) measurement is not less than 1.00 and less than 1.80, a Mooney stress-relaxation rate (MSR) measured at 100° C. of the modified conjugated diene-based polymer is not more than 0.7, and when in the modified conjugated diene-based polymer, the ratio (Mw/Mn) of the polystyrene equivalent weight average molecular weight (Mw) to the polystyrene equivalent number average molecular weight (Mn) by gel permeation chromatography (GPC) measurement is not less than 1.80 and not more than 3.50, a Mooney stress-relaxation rate (MSR) of the modified conjugated diene-based polymer measured at 110° C. is not more than 0.35.

[7]

A modified conjugated diene-based polymer composition comprising:

100 parts by mass of a rubber component containing not less than 20 parts by mass of a modified conjugated diene-based polymer obtained by the method according to any one of [1] to [3] or a modified conjugated diene-based polymer according to any one of [4] to [6], and 0.5 to 300 parts by mass of a silica-based inorganic filler.

Advantageous Effects of the Invention

According to the present invention, a method for producing a modified conjugated diene-based polymer can be provided in which the modified conjugated diene-based polymer has a good balance between the hysteresis loss properties and the wet skid resistance, practically sufficient abrasion resistance and breaking strength, and high processability when the modified conjugated diene-based polymer is formed into a vulcanized product.

Modes for Carrying Out the Invention

Hereinafter, an embodiment for implementing the present invention (hereinafter, referred to as "the present embodiment") will be described in detail. The present embodiment below is only an example for describing the present invention, and the present invention will not be limited to contents below. The present invention can be properly modified within the scope of the gist and implemented.

A method for producing a modified conjugated diene-based polymer according to the present embodiment comprises:

a polymerization step of polymerizing a conjugated diene compound, copolymerizing conjugated diene compounds, or copolymerizing a conjugated diene compound with an aromatic vinyl compound using an alkali metal compound or an alkaline earth metal compound as a polymerization initiator to obtain a conjugated diene-based polymer having an active end, and a modifying step of reacting a compound represented by following formula (1) with the active end of the conjugated diene-based copolymer:

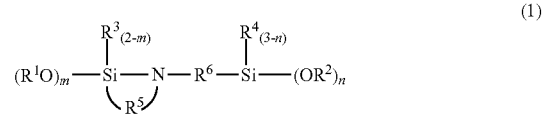

(1)

(wherein R¹ to R⁴ each independently represent an alkyl group or aryl group having 1 to 20 carbon atoms; R⁵ represents an alkylene group having 1 to 10 carbon atoms; R⁶ represents an alkylene group having 1 to 20 carbon atoms; m is an integer of 1 or 2; and n is an integer of 2 or 3.)

In the polymerization step of the modified conjugated diene-based polymer according to the present embodiment, a conjugated diene compound is polymerized, copolymerized with other conjugated diene compound, or copolymerized with an aromatic vinyl compound using an alkali metal compound or an alkaline earth metal compound as a polymerization initiator to obtain a conjugated diene-based polymer having an active end.

The conjugated diene-based polymer that forms a modified conjugated diene-based polymer is a polymer of a single conjugated diene compound, a polymer of different kinds of conjugated diene compounds, i.e., a copolymer of different kinds of conjugated diene compounds, or a copolymer of a conjugated diene compound and an aromatic vinyl compound.

The conjugated diene compound is not particularly limited, and may be any polymerizable monomer. Examples of the polymerizable monomer may include 1,3-butadiene, isoprene, 2,3-dimethyl-1,3-butadiene, 1,3-pentadiene, 3-methyl-1,3-pentadiene, 1,3-heptadiene, and 1,3-hexadiene. Among these, preferable are 1,3-butadiene and isoprene from the viewpoint of industrial availability. One of these may be used alone, or two or more thereof may be used in combination.

The aromatic vinyl compound is not particularly limited, and may be a monomer copolymerizable with the conjugated diene compound. Examples of the aromatic vinyl compound may include styrene, p-methylstyrene, α-methylstyrene, vinylethylbenzene, vinylxylene, vinylnaphthalene, and diphenylethylene. Among these, preferable is styrene from the view point of industrial availability. One of these may be used alone, or two or more thereof may be used in combination.

The conjugated diene-based polymer may be a random copolymer or a block copolymer.

Examples of the random copolymer may include butadiene-isoprene random copolymers, butadiene-styrene random copolymers, isoprene-styrene random copolymers, and butadiene-isoprene-styrene random copolymers. Examples of composition distribution of the respective monomers in the copolymer chain are not particularly limited, and may include perfect random copolymers having a composition close to a statistical random composition, or a tapered (gradient) random copolymer in which distribution of the composition is tapered. The composition having a form of linkage of the conjugated diene, i.e., 1,4-linkages, 1,2-linkages and the like may be uniform or distributed.

Examples of the block copolymer may include two-block copolymers composed of two blocks (diblock), three-block copolymers composed of three blocks (triblock), and four-block copolymers composed of four blocks (tetrablock). For example, the block copolymer is expressed as an S-B diblock copolymer, an S-B-S triblock copolymer, or an S-B-S-B tetrablock copolymer wherein "S" represents a block composed of an aromatic vinyl compound such as styrene, and "B" represents a block composed of the conjugated diene compound such as butadiene and isoprene and/or a block composed of the copolymer of the aromatic vinyl compound and the conjugated diene compound.

In the formulae above, the boundary between blocks does not always need to be clearly distinguished. For example, in the case where the block B is the copolymer of the aromatic vinyl compound and the conjugated diene compound, the aromatic vinyl compound in the block B may be uniformly distributed, or distributed in a tapered manner. Alternatively, in the block B, several portions in which the aromatic vinyl compound is uniformly distributed and/or several portions in which the aromatic vinyl compound is distributed in a tapered manner may coexist. Further, in the block B, several segments having different contents of the aromatic vinyl compound may coexist. In the case where several blocks S and several blocks B exist in the copolymer, the molecular weight and the structure, such as the composition, of these blocks may be the same or different.

In the present embodiment, the conjugated diene-based polymer having a functional group is further hydrogenated in an inactive solvent. Thereby, all or part of double bonds can be converted into saturated hydrocarbons. In this case, heat resistance and weatherability can be improved to prevent deterioration of products during processing at a high temperature. As a result, the obtained products demonstrate higher performance in various applications such as application to automobiles.

More specifically, the degree of hydrogenation of unsaturated double bonds based on the conjugated diene compound can be arbitrarily selected according to the purpose, and is not particularly limited. In use as a vulcanized rubber, preferably, the double bonds in the conjugated diene portion partially remain. From such a viewpoint, the degree of hydrogenation of the conjugated diene portion in the conjugated diene-based polymer is preferably from 3 to 70%, more preferably from 5 to 65%, and still more preferably from 10 to 60%. The degree of hydrogenation of the aromatic double bonds based on the aromatic vinyl compound in the copolymer of the conjugated diene compound and the aromatic vinyl compound is not particularly limited, and is preferably not more than 50%, more preferably not more than 30%, and still more preferably not more than 20%. The degree of hydrogenation can be measured by a nuclear magnetic resonance spectrometer (NMR).

A method for hydrogenation is not particularly limited, and a known method can be used. Examples of a particularly suitable method for hydrogenation may include a method of blowing gaseous hydrogen into a polymer solution in the presence of a catalyst to perform hydrogenation. Examples of the catalyst may include heterogeneous catalysts such as catalysts having a noble metal supported on a porous inorganic substance; and homogeneous catalysts such as catalysts obtained by making a salt such as nickel and cobalt soluble and reacting the salt with organoaluminum or the like, and catalysts using metallocene such as titanocene. Among these, preferable are titanocene catalysts from the viewpoint of allowing selection of a particularly mild hydrogenation condition. Moreover, an aromatic group can be hydrogenated using a supported noble metal catalyst.

Specific examples of the hydrogenation catalyst may include (1) supported heterogeneous hydrogenation catalysts having a metal such as Ni, Pt, Pd, and Ru supported on carbon, silica, alumina, and diatomite, (2) the so-called Ziegler hydrogenation catalyst using an organic acid salt such as Ni, Co, Fe, and Cr or a transition metal salt such as acetylacetone salts and a reducing agent such as organoaluminum, and (3) the so-called organometallic complexes of organometallic compounds such as Ti, Ru, Rh, and Zr. For example, as the hydrogenation catalyst, known hydrogenation catalysts described in Japanese Patent Publication Nos. 42-008704, 43-006636, 63-004841, 01-037970, 01-053851, and 02-009041, and Japanese Patent Laid-Open No. 08-109219 can be used. Examples of a preferable hydrogenation catalyst may include a reaction mixture of a titanocene compound and a reducing organometallic compound.

The alkali metal compound used as the polymerization initiator is not particularly limited, and organolithium compounds are preferable. Examples of the organolithium compound may include low molecule compounds, organiolithium compounds of solubilized oligomers, compounds comprising carbon-lithium bonds in the bonding form of an organic group and lithium, compounds comprising nitrogen-lithium bonds, and compounds comprising tin-lithium bonds.

Examples of the organolithium compound may include n-butyllithium, sec-butyllithium, tert-butyllithium, n-hexyllithium, benzyllithium, phenyllithium, and stilbenelithium.

Examples of the compound comprising nitrogen-lithium bonds may include lithium dimethylamide, lithium diethylamide, lithium dipropylamide, lithium di-n-hexylamide, lithium diisopropylamide, lithium hexamethyleneimide, lithium pyrrolidide, lithium piperidide, lithium heptamethyleneimide, and lithium morpholide.

In addition to the mono-organolithium compounds, a polyfunctional organolithium compound can be used in combination to perform polymerization. Examples of the polyfunctional organolithium compound may include 1,4-dilithiobutane, a reaction product of sec-butyllithium and diisopropenylbenzene, 1,3,5-trilithiobenzene, a reaction product of n-butyllithium, 1,3-butadiene, and divinylbenzene, and reaction products of n-butyllithium and polyacetylene compounds. Further, known organic alkali metal compounds disclosed in U.S. Pat. No. 5,708,092, British Patent No. 2,241,239, U.S. Pat. No. 5,527,753, and the like can also be used.

As the organolithium compound, preferable are n-butyllithium and sec-butyllithium from the viewpoints of industrial availability and easiness to control a polymerization reaction.

One of these organolithium compounds may be used alone, or two or more thereof may be used in combination.

Examples of other organo alkali metal compounds may include organosodium compounds, organopotassium compounds, organorubidium compounds, and organocesium compounds. Specifically, examples thereof may include sodium naphthalene and potassium naphthalene. Besides, examples thereof may include alkoxides, sulfonates, carbonates, and amides of lithium, sodium, and potassium. Moreover, the other organo alkali metal compounds may be used in combination with other organometallic compound.

Examples of the alkaline earth metal compound may include organomagnesium compounds, organocalcium compounds, and organostrontium compounds. Moreover, compounds such as alkoxides, sulfonates, carbonates, and amides of alkaline earth metals may be used. These organo alkaline earth metal compounds may be used in combination with an alkali metal compound or other organometallic compound.

In the present embodiment, the conjugated diene-based polymer is preferably a polymer having an active end and obtained by propagation reaction by an anionic polymerization reaction using the alkali metal compound and/or the alkaline earth metal compound as the polymerization initiator. Particularly, the conjugated diene-based polymer is more preferably a polymer having an active end and obtained by a propagation reaction by living anionic polymerization. Thereby, a modified conjugated diene-based polymer having a high degree of modification can be obtained. The form of the polymerization is not particularly limited, and the polymerization can be performed in batch or in a continuous manner. In the continuous manner, one reactor or two or more reactors connected to each other can be used. A tank reactor with a stirrer or a tubular reactor is used.

If the conjugated diene compound contains allenes, acetylenes, and the like as impurities, the modification reaction described later may be inhibited. For this reason, the total of the concentrations (mass) of these impurities is preferably not more than 200 ppm, more preferably not more than 100 ppm, and still more preferably not more than 50 ppm. Examples of allenes may include propadiene and 1,2-butadiene. Examples of acetylenes may include ethylacetylene and vinylacetylene.

Preferably, the polymerization reaction of the conjugated diene-based polymer is performed in a solvent. Examples of the solvent may include hydrocarbon solvents such as saturated hydrocarbons and aromatic hydrocarbons. Specifically, examples of the hydrocarbon solvents may include aliphatic hydrocarbons such as butane, pentane, hexane, and heptane; alicyclic hydrocarbons such as cyclopentane, cyclohexane, methylcyclopentane, and methylcyclohexane; aromatic hydrocarbons such as benzene, toluene, and xylene and hydrocarbons comprising a mixture thereof. Preferably, impurities such as allenes and acetylenes are treated with an organometal compound before the conjugated diene compound is subjected to the polymerization reaction because a polymer having an active end in a high concentration is likely to be obtained and further a higher degree of modification is likely to be achieved.

In the polymerization reaction of the conjugated diene-based polymer, a polar compound may be added. The polar compound enables random copolymerization of the aromatic vinyl compound with the conjugated diene compound, and can be used as a vinylating agent for controlling a microstructure of a conjugated diene portion. The polar compound is also effective in acceleration of the polymerization reaction or the like.

The polar compound is not particularly limited. For example, ethers such as tetrahydrofuran, diethyl ether, dioxane, ethylene glycol dimethylether, ethylene glycol dibutylether, diethylene glycol dimethylether, diethylene glycol dibutylether, dimethoxybenzene, and 2,2-bis(2-oxolanyl) propane; tertiary amine compounds such as tetramethylethylenediamine, dipiperidinoethane, trimethylamine, triethylamine, pyridine, and quinuclidine; alkali metal alkoxide compounds such as potassium-tert-amylate, potassium-tert-butyrate, sodium-tert-butyrate, and sodium amylate; phosphine compounds such as triphenylphosphine, and the like can be used. One of these polar compounds may be used alone, or two or more thereof may be used in combination.

The amount of the polar compound to be used is not particularly limited, and is selected depending on the purpose and the like. Usually, the amount of the polar compound to be used is preferably from 0.01 to 100 mol based on 1 mol of the polymerization initiator. Such a polar compound (vinylating agent) may be properly used as a regulator for the microstructure of the conjugated diene portion in the polymer depending on a desired vinyl linkage content. Many polar compounds simultaneously have an effective randomizing effect in the copolymerization of the conjugated diene compound with the aromatic vinyl compound, and can be used for adjustment of distribution of the aromatic vinyl compound or as an adjuster for the amount of the styrene block. As a method for randomizing the conjugated diene compound and the aromatic vinyl compound, for example, a method may be used in which the copolymerization reaction is started with the total amount of styrene and part of 1,3-butadiene, and the remaining 1,3-butadiene is intermittently added during the copolymerization reaction, as described in Japanese Patent Laid-Open No. 59-140211.

The polymerization temperature is not particularly limited as long as it is a temperature at which the living anionic polymerization progresses. From the viewpoint of productivity, the temperature is preferably not less than 0° C. From the viewpoint of securing a sufficient reaction amount of the modifier to the active end after the polymerization is terminated, the temperature is preferably not more than 120° C. Moreover, from the viewpoint of preventing cold flow of the conjugated diene-based polymer, a polyfunctional aromatic vinyl compound such as divinylbenzene may be used for control of branching.

The amount of conjugated diene to be bonded in the conjugated diene-based polymer according to the present embodiment is not particularly limited, and the amount is preferably from 50 to 100% by mass, and more preferably from 60 to 80% by mass. The amount of aromatic vinyl to be bonded in the conjugated diene-based polymer according to the present embodiment is not particularly limited, and the amount is preferably from 0 to 50% by mass, and more preferably from 20 to 40% by mass. If the amount of conjugated diene to be bonded and the amount of aromatic vinyl to be bonded are within the ranges, a vulcanized product can be obtained in which the balance between the hysteresis loss properties and the wet skid resistance is better and the abrasion resistance and breaking strength are satisfactory. Here, the amount of aromatic vinyl to be bonded can be measured by ultraviolet absorption of a phenyl group. From this, the amount of conjugated diene to be bonded can also be determined. Specifically, the amount of aromatic vinyl to be bonded can be measured by the method according to Examples described later.

Moreover, the vinyl linkage content in the conjugated diene bond units is not particularly limited, and it is preferably from 10 to 75 mol %, and more preferably from 25 to 65 mol %. At a vinyl linkage content within the range, a vulcanized product can be obtained in which the balance between the hysteresis loss properties and the wet skid resistance is better and the abrasion resistance and breaking strength are satisfactory. Here, in the case where the modified conjugated diene-based polymer is a copolymer of butadiene and styrene, the vinyl linkage content (1,2-linkage content) in the butadiene bond units can be determined by a Hampton method (R. R. Hampton, Analytical Chemistry, 21, 923 (1949)).

If the microstructure of the modified conjugated diene-based polymer is within the range, and the glass transition temperature of the copolymer is within the range of from −45° C. to −15° C., a vulcanized product can be obtained in which the balance between the hysteresis loss properties and the wet skid resistance is much better. As the glass transition temperature, according to ISO 22768: 2006, a DSC curve is recorded while the temperature is raised in a predetermined temperature range. The peak top (Inflection point) of the DSC differentiation curve is defined as the glass transition temperature.

In the case where the conjugated diene-based polymer according to the present embodiment is the conjugated diene-aromatic vinyl copolymer, preferably, the number of the block in which not less than 30 aromatic vinyl units are chained is small or there is no such a block. Specifically, in the case where the copolymer is a butadiene-styrene copolymer, the polymer is decomposed by a Kolthoff method (a method described in I. M. KOLTHOFF, et al., J. Polym. Sci. 1, 429 (1946)). In a known method for analyzing the amount of polystyrene insoluble in methanol, the proportion of the block in which not less than 30 aromatic vinyl units are chained is preferably not more than 5% by mass, and more preferably not more than 3% by mass based on the total amount of the polymer.

By the method described above, the conjugated diene-based polymer having an active end is obtained, and a modifying step of reacting the compound represented by following formula (1) (hereinafter, referred to as a "modifier" in some cases) with the active end is performed. Thereby, the modified conjugated diene-based polymer according to the present embodiment can be obtained.

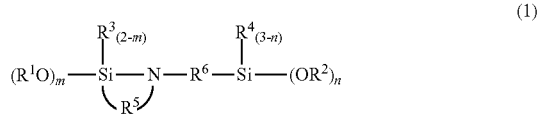

(1)

(wherein $R^1$ to $R^4$ each independently represent an alkyl group or aryl group having 1 to 20 carbon atoms; $R^5$ represents an alkylene group having 1 to 10 carbon atoms; $R^6$ represents an alkylene group having 1 to 20 carbon atoms; m is an integer of 1 or 2; and n is an integer of 2 or 3.)

Preferably, $R^1$ to $R^4$ are an alkyl group, and the alkyl group has 1 to 10 carbon atoms. In $R^5$ and $R^6$, the alkylene group has preferably from 2 to 7 carbon atoms, and more preferably from 3 to 5 carbon atoms.

Examples of the modifier represented by above formula (1) may include cyclic azasilane compounds such as 2,2-dimethoxy-1-(3-trimethoxysilylpropyl)-1-aza-2-silacyclopentane, 2,2-diethoxy-1-(3-triethoxysilylpropyl)-1-aza-2-silacyclopentane, 2,2-dimethoxy-1-(4-trimethoxysilylbutyl)-1-aza-2-silacyclohexane, 2,2-dimethoxy-1-(5-trimethoxysilylpentyl)-1-aza-2-silacycloheptane, 2,2-dimethoxy-1-(3-dimethoxymethylsilylpropyl)-1-aza-2-silacyclopentane, 2,2-diethoxy-1-(3-diethoxyethylsilylpropyl)-1-aza-2-silacyclopentane, 2-methoxy-2-methyl-1-(3-trimethoxysilylpropyl)-1-aza-2-silacyclopentane, 2-ethoxy-2-ethyl-1-(3-triethoxysilylpropyl)-1-aza-2-silacyclopentane, 2-methoxy-2-methyl-1-(3-dimethoxymethylsilylpropyl)-1-aza-2-silacyclopentane, and 2-ethoxy-2-ethyl-1-(3-diethoxyethylsilylpropyl)-1-aza-2-silacyclopentane. Among these, preferable are those wherein m is 2 and n is 3 from the viewpoint of the reactivity and interaction properties of the functional group in the modifier with an inorganic filler such as silica, and processability. Preferred specific examples may include 2,2-dimethoxy-1-(3-trimethoxysilylpropyl)-1-aza-2-silacyclopentane, and 2,2-diethoxy-1-(3-triethoxysilylpropyl)-1-aza-2-silacyclopentane.

In the modifying step, the active end in the conjugated diene-based copolymer may be reacted with the modifier represented by above formula (1). The action is presumed as follows. For example, in the case where an azasilane compound having a cyclic structure such as 2,2-dimethoxy-1-(3-trimethoxysilylpropyl)-1-aza-2-silacyclopentane is used as the modifier, the active end of the conjugated diene-based copolymer reacts with an alkoxysilyl group or an Si—N bonding portion in the modifier to form a bond of the end of the conjugated diene-based polymer and Si (see formula (2)). For example, in the case where 1 mol of the modifier is reacted with 4 mol of the active end of the conjugated diene-based polymer, a modified conjugated diene-based polymer is obtained to which four molecular chains represented by following formula (2) are coupled. By a further reaction with alcohol and water and the like, a secondary amino group is formed. It is thought that by use of the modified conjugated diene-based polymer having a secondary amino group and an alkoxysilyl group, a good balance between the hysteresis loss properties and the wet skid resistance is provided when a vulcanized product is produced, practically sufficient abrasion resistance and breaking strength can be given, and high processability can be demonstrated (however, the action of the present embodiment will not be limited to this).

(2)

Polym⁻-Li⁺ +

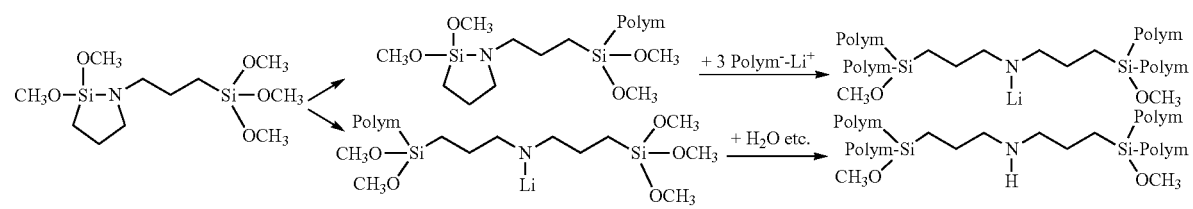

(wherein Polym represents a conjugated diene-based polymer chain.)

So far, examples of particularly suitable embodiments of the modified conjugated diene-based polymer have been mainly described. In the present embodiment, the modified conjugated diene-based polymer may be a modified conjugated diene-based polymer which comprises two silyl groups to which an alkoxy group is bonded and which comprises a functional group including a secondary amino group within the molecule, for example. Such a modified conjugated diene-based polymer can be obtained, for example, by a modifying step of reacting, with the active end of the conjugated diene-based copolymer, a modifier which comprises two silyl groups to which an alkoxy group is bonded and which comprises a functional group including a secondary amino group.

For example, if the same modification reaction as above is performed using a modifier which comprises two silyl groups to which an alkoxy group is bonded and which comprises a functional group including a secondary amino group within the molecule (such as bis[3-(trimethoxysilyl)propyl]amine), the active end of the conjugated diene-based polymer abstracts active hydrogen in the secondary amino group of the modifier. As a result, inactivation of the active end progresses with priority, and the modification reaction is not effectively performed. For this, a large amount of a non-modified conjugated diene-based polymer may be formed. In such a case, preferably, a method is used in which a preparatory treatment step of forming active hydrogen into an alkali metal or alkaline earth metal is performed before the modifying step. Any treatment method described as above is used without particular limitation, and for example, a known method disclosed in Japanese Patent Laid-Open No. 2004-182894 can also be used. Alternatively, a protected modifier can be used in which active hydrogen is replaced by triorganosilyl groups. By performing such a pre-treatment, a modified conjugated diene-based polymer having a higher degree of modification can be obtained. Examples of the modifier which can be used in such a case may include bis[3-(trimethoxysilyl)propyl]amine, bis[3-(triethoxysilyl) propyl]amine, bis[3-(dimethoxymethylsilyl)propyl]amine, [3-(dimethoxymethylsilyl)propyl]amine, and [3-(diethoxyethylsilyl)propyl]amine.

Here, a case where bis[3-(trimethoxysilyl)propyl]amine is used as the modifier, and active hydrogen is lithiated using n-butyllithium will be described as an example. As the preparatory treatment step before the modifying step, active hydrogen of bis[3-(trimethoxysilyl)propyl]amine is acted with an equivalent of n-butyllithium to abstract active hydrogen to form a lithium salt of bis[3-(trimethoxysilyl)propyl]amine. The modifier is subjected to such a preparatory treatment and to the modifying step. Thereby, inactivation of the active end of the conjugated diene-based polymer by the active hydrogen can be prevented to obtain high modification efficiency.

The reaction temperature and reaction time when the modifier is reacted with the polymerization active end are not particularly limited. The reaction is made preferably at from 0 to 120° C. for not less than 30 seconds.

The amount of the modifier to be added is not particularly limited, and the total number of moles of the alkoxy group bonded to the silyl group in the modifier is preferably within the range of from 0.6 to 3 times the number of moles of the polymerization initiator, more preferably within the range of from 0.8 to 2.5 times the number of moles of the polymerization initiator, and still more preferably within the range of from 0.8 to 2 times the number of moles of the polymerization initiator. The total number of moles of the alkoxy group is preferably 0.6 times or more from the viewpoint of obtaining a sufficient degree of modification in the modified conjugated diene-based polymer to be obtained. The total number of moles of the alkoxy group is preferably 3 times or less from the viewpoint of obtaining a branched polymer component by coupling the ends of the polymer for improving the processability, and from the view point of cost of the modifier.

From the viewpoint of providing a higher effect of the present embodiment, the modified conjugated diene-based polymer is preferably produced such that the degree of modification determined from the amount to be adsorbed to a column filled with silica particles by gel permeation chromatography (GPC) measurement using the column (hereinafter, simply referred to as a "degree of modification" in some cases), namely, the proportion of the polymer having a functional group component (for example, the modified conjugated diene-based polymer modified with the compound represented by formula (1)) is preferably not less than 20% by mass, more preferably not less than 50% by mass, and still more preferably not less than 60% by mass. Preferred specific examples of the modified conjugated diene-based polymer may include modified conjugated diene-based polymers which comprises two silyl groups to which an alkoxy group is bonded and which comprises a functional group including a secondary amino group within the molecule, and having the degree of modification of not less than 20% by mass, more preferably not less than 50% by mass, and still more preferably not less than 60% by mass, the degree of modification being determined by the amount to be adsorbed to a column filled with silica particles by gel permeation chromatography (GPC) measurement using the column. As a method for determining the amount of polymer having a functional group component, chromatography can be used for measurement in which a modified component containing a functional group can be separated from a non-modified component. Examples of the method using chromatography may include a method in which determination is performed using GPC column using a polar substance that adsorbs the functional group component, such as silica, as a filler, and using the internal standard of a non-adsorbed component for comparison.

The polystyrene equivalent number average molecular weight (Mn) of the modified conjugated diene-based polymer according to the present embodiment obtained by gel permeation chromatography (GPC) measurement is preferably from 20,000 to 2,000,000, more preferably from 100,000 to 1,000,000, still more preferably from 200,000 to 600,000, and still further more preferably from 300,000 to 500,000. At a molecular weight not less than the lower limit value, the strength when the modified conjugated diene-based polymer is formed into a vulcanized product can be further improved. At a molecular weight not more than the upper limit value, the processability can be further improved. From the viewpoint of physical properties of the vulcanized product, the ratio (Mw/Mn) of the weight average molecular weight (Mw) to the number average molecular weight (Mn) is preferably from 1.00 to 3.50, and more preferably from 1.10 to 3.00.

Particularly, in the modified conjugated diene-based polymer, if the ratio (Mw/Mn) of the polystyrene equivalent weight average molecular weight (Mw) to the polystyrene equivalent number average molecular weight (Mn) by the gel permeation chromatography (GPC) measurement is not less than 1.00 and less than 1.80, the Mooney stress-relaxation rate (MSR) of the modified conjugated diene-based polymer measured at 100° C. is preferably not more than 0.7. If the ratio (Mw/Mn) of the polystyrene equivalent weight average molecular weight (Mw) to the polystyrene equivalent number average molecular weight (Mn) by the gel permeation chromatography (GPC) measurement is not less than 1.80 and not more than 3.50, the Mooney stress-relaxation rate (MSR) of the modified conjugated diene-based polymer measured at 110° C. is preferably not more than 0.35.

In the case where the modified conjugated diene-based polymer according to the present embodiment is produced by a batch process, the ratio (Mw/Mn) of the weight average molecular weight (Mw) to the number average molecular weight (Mn) is preferably not less than 1.00 and less than 1.80, more preferably from 1.00 to 1.60, and still more preferably from 1.05 to 1.50. From the viewpoint of physical properties of the vulcanized product such as hysteresis loss and strength, the ratio (Mw/Mn) of the weight average molecular weight to the number average molecular weight is preferably less than 1.80. The Mooney stress-relaxation rate (MSR) at 100° C. of the modified conjugated diene-based polymer produced by the batch process is preferably not more than 0.7, and more preferably not more than 0.65. A Mooney stress-relaxation rate of not more than 0.7 designates a high branching degree of the modified conjugated diene-based polymer, which is preferred from the viewpoint of processability. The Mooney stress-relaxation rate is obtained as follows according to the method specified in ISO 289-4: 2003: after the Mooney viscosity is measured, the rotor is stopped; a torque (T) from 1.6 seconds to 5 seconds after the rotor is stopped and a time (t (sec)) are log-log plotted. The Mooney stress-relaxation rate is the absolute value of the slope of the plot. When the Mooney viscosity is the same, this value is smaller as branching is larger. For this, the Mooney stress-relaxation rate can be used as an index indicating a degree of branching. Specifically, the Mooney stress-relaxation rate can be determined by the method described in Examples later.

In the case where the modified conjugated diene-based polymer according to the present embodiment is produced by the continuous process, the ratio (Mw/Mn) of the weight average molecular weight (Mw) to the number average molecular weight (Mn) is preferably from 1.80 to 3.50, more preferably from 1.90 to 3.00, and still more preferably from 2.00 to 2.80. The ratio (Mw/Mn) of the weight average molecular weight (Mw) to the number average molecular weight (Mn) is preferably the upper limit value or less from the viewpoint of physical properties of the vulcanized product such as hysteresis loss and strength, and preferably the lower limit value or more from the viewpoint of processability. In the case where the modified conjugated diene-based polymer according to the present embodiment is produced by the continuous process, the Mooney stress-relaxation rate (MSR) of the modified conjugated diene-based polymer at 110° C. is preferably not more than 0.35, more preferably not more than 0.3, and still more preferably not more than 0.25. From the viewpoint of processability, the Mooney stress-relaxation rate is preferably within the range. Here, in the case where the modified conjugated diene-based polymer is produced by the continuous process, a polymer having a higher weight average molecular weight is obtained than that in the case where a polymer having the same number average molecular weight is produced by the batch process. Accordingly, the polymer is not sufficiently plasticized at 100° C., and an accurate Mooney viscosity and Mooney stress-relaxation rate may not be measured. For this, the measurement temperature to be used is 110° C.

In the method for producing a modified conjugated diene-based polymer according to the present embodiment, after the modification reaction is performed, a deactivating agent, a neutralizer and the like may be added to the copolymer solution when necessary. Examples of the deactivating agent are not particularly limited, and may include water; and alcohols such as methanol, ethanol, and isopropanol. Examples of the neutralizer are not particularly limited, and may include carboxylic acids such as stearic acid, oleic acid, and versatic acid (mixture of carboxylic acids having 9 to 11 carbon atoms and mainly 10 carbon atoms, and having many branching); and aqueous solutions of inorganic acids and carbon dioxide gas.

From the viewpoints of preventing formation of gel after the polymerization, and improving stability during the process, a stabilizer for rubber is preferably added to the modified conjugated diene-based polymer according to the present embodiment. The stabilizer for rubber is not particularly limited, and a known one can be used. Preferable examples are antioxidizing agent such as 2,6-di-tert-butyl-4-hydroxytoluene (BHT), n-octadecyl-3-(4'-hydroxy-3',5'-di-tert-butylphenol)propionate, 2-methyl-4,6-bis[(octylthio)methyl]phenol, and the like.

In order to improve more the processability of the modified conjugated diene-based polymer according to the present embodiment, an extender oil can be added to the modified conjugated diene-based polymer when necessary. The method for adding an extender oil to a modified conjugated diene-based polymer is not particularly limited. Preferable is a method in which an extender oil is added to a polymer solution, and mixed to prepare an extended copolymer solution, and the solvent is removed from the oil-extended copolymer solution. Examples of the extender oil may include aromatic oils, naphthenic oils, and paraffinic oils. Among these, preferable are alternative aromatic oils containing a polycyclic aromatic (PCA) component whose content determined according to the IP 346 method is not more than 3% by mass, from the viewpoint of environmental safety, prevention of oil bleeding and wet grip properties. Examples of the alternative aromatic oils may include TDAE (Treated Distillate Aromatic Extracts) and MES (Mild Extraction Solvate) shown in Kautschuk Gummi Kunststoffe 52(12) 799 (1999), and RAE (Residual Aromatic Extracts). The amount of the extender oil to be added is not particularly limited. Usually, the amount is from 10 to 60 parts by mass, and preferably from 20 to 37.5 parts by mass based on 100 parts by mass of the modified conjugated diene-based polymer.

As the method for obtaining the modified conjugated diene-based polymer according to the present embodiment from the polymer solution, a known method can be used. Examples of the method may include a method in which a solvent is separated by steam stripping or the like, and a polymer is filtered off, dewatered and dried to obtain a polymer; a method in which a polymer solution is condensed using a flushing tank, and volatilized by a vent extruder or the like; and a method in which a polymer solution is directly volatilized by a drum drier or the like.

The modified conjugated diene-based polymer according to the present embodiment is suitably used as a vulcanized product. For example, the vulcanized product can be obtained as follows: the modified conjugated diene-based polymer according to the present embodiment is mixed with an inorganic filler such as a silica-based inorganic filler and carbon black, a rubber-like polymer other than the modified conjugated diene-based polymer according to the present embodiment, a silane coupling agent, a rubber softener, a vulcanizing agent, a vulcanization accelerator and aid, and the like when necessary to prepare a modified conjugated diene-based polymer composition, and the modified conjugated diene-based polymer composition is heated and vulcanized. Among these, preferable is a modified conjugated diene-based polymer composition comprising a rubber component containing the modified conjugated diene-based polymer according to the present embodiment, and a silica-based inorganic filler. The modified conjugated diene-based polymer composition more preferably contains 100 parts by mass of the rubber component containing not less than 20 parts by mass of the modified conjugated diene-based polymer and from 0.5 to 300 parts by mass of the silica-based inorganic filler.

A silica-based inorganic filler is dispersed in the modified conjugated diene-based polymer according to the present embodiment. Thereby, the modified conjugated diene-based polymer can have a good balance between the hysteresis loss properties and the wet skid resistance and practically sufficient abrasion resistance and breaking strength, and obtain high processability when the modified conjugated diene-based polymer is formed into a vulcanized product. Preferably, a silica-based inorganic filler is contained also in the case where the modified conjugated diene-based polymer composition according to the present embodiment is used for automobile parts such as tires and vibration-proof rubbers, and for vulcanized rubbers such as shoes.

In the conjugated diene-based polymer composition, a rubber-like polymer other than the modified conjugated diene-based polymer according to the present embodiment can be used in combination with the modified conjugated diene-based polymer according to the present embodiment. Examples of such a rubber-like polymer are not particularly limited, and may include conjugated diene-based polymers or hydrogenated products thereof, random copolymers of a conjugated diene compound and a vinyl aromatic compound or hydrogenated products thereof, block copolymers of a conjugated diene compound and a vinyl aromatic compound or hydrogenated products thereof, non-diene-based polymers, and natural rubbers.

Specifically, examples of the rubber-like polymer may include butadiene rubbers and hydrogenated products thereof; isoprene rubbers and hydrogenated products thereof; styrene-butadiene rubbers and hydrogenated products thereof; styrene-based elastomers such as styrene-butadiene block copolymers and hydrogenated products thereof, and styrene-isoprene block copolymers and hydrogenated products thereof; and acrylonitrile-butadiene rubbers and hydrogenated products thereof.

Further, examples of the non-diene-based polymers may include olefin-based elastomers such as ethylene-propylene rubbers, ethylene-propylene-diene rubbers, ethylene-butene-diene rubbers, ethylene-butene rubbers, ethylene-hexene rubbers, ethylene-octene rubbers; butyl rubbers; brominated butyl rubbers; acrylic rubbers; fluorine rubbers; silicone rubbers; chlorinated polyethylene rubbers; epichlorohydrin rubbers; α,β-unsaturated nitrile-acrylic acid ester-conjugated diene copolymerization rubbers; urethane rubbers; and polysulfide rubbers.

The variety of rubber-like polymers above may be a modified rubber having a polar functional group such as a hydroxyl group and an amino group. From the viewpoint of a balance between performance and processing properties, the weight average molecular weight is preferably from 2,000 to 2,000,000, and more preferably from 5,000 to 1,500,000. Alternatively, a low molecular weight, so-called liquid rubber can be used. One of these rubber-like polymers may be used alone, or two or more thereof may be used in combination.

In the case of the modified conjugated diene-based polymer composition comprising the modified conjugated diene-based polymer according to the present embodiment and the rubber-like polymer, the blending ratio (mass ratio) of the modified conjugated diene-based polymer/the rubber-like polymer is preferably from 20/80 to 100/0, and more preferably from 30/70 to 90/10, and still more preferably from 50/50 to 80/20. Accordingly, the modified conjugated diene-based polymer composition contains preferably from 20 to 100 parts by mass, more preferably from 30 to 90 parts by mass, and still more preferably from 50 to 80 parts by mass of the modified conjugated diene-based polymer, based on 100 parts by mass of the rubber component. At a blending ratio of modified conjugated diene-based polymer/rubber-like polymer within the range, a vulcanized product can be obtained in which the balance between the hysteresis loss properties and the wet skid resistance is better, and the abrasion resistance and breaking strength are more satisfactory.

The silica-based inorganic filler is not particularly limited, and a known one can be used. Preferable are solid particles containing $SiO_2$ or $Si_3Al$ as a structural unit. More preferably, $SiO_2$ or $Si_3Al$ is the principal component of the structural unit. Here, the principal component refers to a component contained not less than 50% by mass, preferably not less than 70% by mass, and more preferably not less than 80% by mass in the silica-based inorganic filler.

Specifically, examples of the silica-based inorganic filler may include silica, clay, talc, mica, diatomite, wollastonite, montmorillonite, zeolite, and inorganic fibrous substances such as glass fibers. Alternatively, a silica-based inorganic filler having a hydrophobized surface, or a mixture of the silica-based inorganic filler and an inorganic filler other than silica-based inorganic filler can be used. Among these, silica and glass fibers are preferable, and silica is more preferable from the viewpoint of strength and abrasion resistance. Examples of silica may include anhydrous silica, precipitated silica, and synthetic silicic acid salt silica. Among these, preferable is precipitated silica from the viewpoint of a good balance between the effect of improving the breaking properties and the wet skid resistance.

In the modified conjugated diene-based polymer composition, from the viewpoint of obtaining practically sufficient abrasion resistance and breaking properties, the nitrogen adsorption specific surface area of the silica-based inorganic filler determined by the BET adsorption method is preferably from 100 to 300 $m^2/g$, and more preferably from 170 to 250 $m^2/g$. When necessary, a silica-based inorganic filler having a relatively small specific surface area (for example, a silica-based inorganic filler having a specific surface area of 200 $m^2/g$ or less) and a silica-based inorganic filler having a relatively large specific surface area (for example, silica-based inorganic filler having a specific surface area of not less than 200 $m^2/g$) can be used in combination. Thereby, high abrasion resistance and breaking properties and hysteresis loss properties can be obtained in a highly balanced manner.

As described above, the amount of the silica-based inorganic filler to be blended in the modified conjugated diene-based polymer composition is preferably from 0.5 to 300 parts by mass, more preferably from 5 to 200 parts by mass, and still more preferably from 20 to 100 parts by mass based on 100 parts by mass of the rubber component containing the modified conjugated diene-based polymer according to the present embodiment. The amount of the silica-based inorganic filler to be blended is preferably not less than 0.5 parts by mass from the viewpoint of demonstrating the effect of the added inorganic filler, and the amount is preferably not more than 300 parts by mass from the viewpoint of sufficiently dispersing the inorganic filler to obtain a composition having practically sufficient processability and mechanical strength.

The modified conjugated diene-based polymer composition may contain carbon black. Carbon black is not particularly limited, and for example, carbon black of each class such as SRF, FEF, HAF, ISAF, and SAF can be used. Among these, preferable is carbon black in which a nitrogen adsorption specific surface area is not less than 50 $m^2/g$, and a dibutyl phthalate (DBP) absorption number is 80 mL/100 g.

The amount of carbon black to be blended is preferably from 0.5 to 100 parts by mass, more preferably 3 to 100 parts by mass, and still more preferably from 5 to 50 parts by mass based on 100 parts by mass of a rubber component containing the modified conjugated diene-based polymer according to the present embodiment. The amount of carbon black to be blended is preferably not less than 0.5 parts by mass from the viewpoint of demonstrating dry grip performance and performance such as conductivity required in application of tires and the like, and preferably not more than 100 parts by mass from the viewpoint of dispersibility.

The modified conjugated diene-based polymer composition may contain a metal oxide and a metal hydroxide in addition to the silica-based inorganic filler and carbon black. The metal oxide is a solid particle containing a compound represented by formula $M_xO_y$ (M represents a metal atom, and x and y each represent an integer of from 1 to 6) as a principal component of the structural unit. For example, alumina, titanium oxide, magnesium oxide, and zinc oxide can be used. Alternatively, a mixture of the metal oxide and an inorganic filler other than the metal oxide can be used. The metal hydroxide is not particularly limited, and examples thereof may include aluminum hydroxide, magnesium hydroxide, and zirconium hydroxide.

The modified conjugated diene-based polymer composition may contain a silane coupling agent. The silane coupling agent has a function to make the interaction between the rubber component and the silica-based inorganic filler close, and has a group affinitive with or bondable to the rubber component and a group affinitive with or bondable to the silica-based inorganic filler. Usually, a compound having a sulfur bond portion, an alkoxy silyl group, a silanol group portion in one molecule is used. Specifically, examples of the silane coupling agent may include bis-[3-(triethoxysilyl)-propyl]-tetrasulfide, bis-[3-(triethoxysilyl)-propyl]-disulfide, and bis-[2-(triethoxysilyl)-ethyl]-tetrasulfide.

The amount of the silane coupling agent to be blended is preferably from 0.1 to 30 parts by mass, more preferably from 0.5 to 20 parts by mass, and still more preferably from 1 to 15 parts by mass based on 100 parts by mass of the silica-based inorganic filler. At an amount of the silane coupling agent to be blended within the range, the effect of the added silane coupling agent can be more remarkable.

In order to improve processability, the modified conjugated diene-based polymer composition may contain a rubber softener. As the rubber softener, mineral oil, liquid or low molecular weight synthetic softeners are suitable. The mineral oil rubber softener referred to as a process oil or extender oil, which is used in order to soften the rubber, increase the volume, and improve the processability, is a mixture of an aromatic ring, a naphthene ring, and paraffin chains. If the carbon atoms of the paraffin chains are not less than 50% of the total carbons, the rubber softener is referred to as a paraffinic rubber softener. If the carbon atoms of the naphthene ring are from 30 to 45% of the total carbons, it is referred to as a naphthenic rubber softener. If the aromatic carbon atoms are more than 30% of the total carbons, it is referred to as an aromatic rubber softener. As the rubber softener used with the modified conjugated diene-aromatic vinyl copolymer according to the present embodiment, those containing a proper amount of aromatics are preferable because such a rubber softener tends to have affinity with the copolymer.

The amount of the rubber softener to be blended is preferably from 0 to 100 parts by mass, more preferably from 10 to 90 parts by mass, and still more preferably from 30 to 90 parts by mass based on 100 parts by mass of the rubber component containing the modified conjugated diene based polymer according to the present embodiment. If the amount of the rubber softener to be blended is more than 100 parts by mass based on 100 parts by mass of the rubber component, bleed out may be easily occurred and stickiness of the surface of the composition may be occurred.

The method for mixing the modified conjugated diene-based polymer according to the present embodiment with the other rubber-like polymer and additives such as the silica-based inorganic filler, carbon black, other filler, the silane-based coupling agent, and the rubber softener is not particularly limited. Examples of the method may include a melt kneading method using an ordinary mixer such as an open roll mill, a Banbury mixer, a kneader, a single screw extruder, a twin screw extruder, and a multi screw extruder, and a method of dissolving and mixing components, and heating and removing a solvent. Among these, preferable is the melt kneading method using a roll, a Banbury mixer, a kneader, or an extruder from the viewpoint of the productivity and good kneading properties. Moreover, a method of kneading the modified conjugated diene-based polymer and a variety of additives at one time, or a method of dividing the modified conjugated diene-based polymer and a variety of additives into several portions to perform mixing can be used.

The modified conjugated diene-based polymer composition may be a vulcanized composition obtained by vulcanization by a vulcanizing agent. As the vulcanizing agent, a radical generator such as organic peroxides and azo compounds, oxime compounds, nitroso compounds, polyamine compounds, sulfur, and sulfur compounds can be used, for example. The sulfur compounds may include sulfur monochloride, sulfur dichloride, disulfide compounds, polymeric polysulfide compounds, and the like. The amount of the vulcanizing agent to be used is usually from 0.01 to 20 parts by mass, and preferably from 0.1 to 15 parts by mass based on 100 parts by mass of the rubber component containing the modified conjugated diene-based polymer according to the present embodiment. As the method for vulcanization, a conventionally known method can be used. The vulcanizing temperature is usually from 120 to 200° C., and preferably from 140 to 180° C.

In the vulcanization, a vulcanization accelerator may be used when necessary. As the vulcanization accelerator, a conventionally known material can be used. Examples of the vulcanization accelerator may include vulcanization accelerators such as sulfenamide-based vulcanization accelerators, guanidine-based vulcanization accelerators, thiuram-based vulcanization accelerators, aldehyde-amine-based vulcanization accelerators, aldehyde-ammonia-based vulcanization accelerators, thiazole-based vulcanization accelerators, thiourea-based vulcanization accelerators, and dithiocarbamate-based vulcanization accelerators. As the vulcanization aid, zinc oxide, stearic acid, and the like can be used. The amount of the vulcanization accelerator to be used is usually from 0.01 to 20 parts by mass, and preferably from 0.1 to 15 parts by mass based on 100 parts by mass of the rubber component containing the modified conjugated diene-based polymer according to the present embodiment.

In the modified conjugated diene-based polymer composition, a softener and filler other than those described above, and a variety of additives such as a heat stabilizer, an antistatic agent, a weather stabilizer, an antioxidant, a coloring agent, and a lubricant may be used within the range in which the purpose of the present embodiment is not impaired. As the other softener, a known softener can be used. Examples of the other filler specifically may include calcium carbonate, magnesium carbonate, aluminium sulfate, and barium sulfate. As the heat stabilizer, antistatic agent, weather stabilizer, antioxidant, coloring agent, and lubricant described above, known materials can be used.

EXAMPLES

According to Examples below, the present invention will be described more in detail, but the present invention will not be limited to Examples below. Samples were analyzed according to the methods shown below.

(1) Bound Styrene Content 100 mg of the sample was made up to 100 mL with chloroform and dissolved therein to prepare a sample to be measured. Based on absorption of the UV at 254 nm by a phenyl group in styrene, the bound styrene content (% by mass) was measured (spectrophotometer "UV-2450" made by Shimadzu Corporation).

(2) Microstructure of Butadiene Portion (1,2-Vinyl Linkage Content)

50 mg of the sample was dissolved in 10 mL of carbon disulfide to obtain a sample to be measured. Using a solution cell, an infrared spectrum was measured within the range of from 600 to 1000 $cm^{-1}$, and the microstructure of a butadiene portion was determined based on the absorbance at a predetermined wave number by the expression according to the Hampton method (Foulier Infrared Spectrophotometer "FT-IR230" made by JASCO Corporation).

(3) Mooney Viscosity and Mooney Stress-Relaxation Rate

Using a Mooney viscometer ("VR1132" made by Ueshima Seisakusho Co., Ltd.), the Mooney viscosity and Mooney stress-relaxation rate were measured according to JIS K6300 (ISO 289-1) and ISO 289-4. The measurement temperature was 100° C. in the case of the batch polymerization, and 110° C. in the case of the continuous polymerization. First, the sample was preheated for 1 minute, and rotated at 2 rpm by a rotor. 4 minutes later, the torque was measured, and defined as the Mooney viscosity ($ML_{1+4}$). Subsequently, rotation of the rotor was immediately stopped. From 1.6 to 5 seconds after the rotor was stopped, the torque was recorded every 0.1 seconds in Mooney units, and the slope of the line when the torque and the time (sec) were log-log plotted was determined. The absolute value of the slope was defined as the Mooney stress-relaxation rate (MSR).

(4) Glass Transition Temperature (Tg)

According to ISO 22768: 2006, using a differential scanning calorimeter "DSC3200S" made by Mac Science Co., Ltd., the DSC curve was recorded while the temperature was raised from −100° C. at 20° C./min under a flow of helium at 50 mL/min. The peak top of the DSC differential curve (Inflection point) was defined as the glass transition temperature.

(5) Molecular Weight

A chromatogram was obtained by measurement using a GPC measurement device using a series of three columns in which a polystyrene-based gel was used as a filler. The weight average molecular weight (Mw) and the number average molecular weight (Mn) were determined according to a calibration curve using standard polystyrene. Tetrahydrofuran (THF) was used as an eluent. The columns used were a guard column: made by Tosoh Corporation TSKguardcolumn HHR-H, and columns: made by Tosoh Corporation TSKgel G6000 HHR, TSKgel G5000 HHR, and TSKgel G4000 HHR. On the condition of a temperature of an oven of 40° C. and a flow rate of THF of 1.0 mL/min, an RI detector ("HLC8020" made by Tosoh Corporation) was used. 10 mg of the sample to be measured was dissolved in 20 mL of THF to prepare a measurement solution, and 200 μL of the measurement solution was injected into the GPC measurement apparatus, and measured.

(6) Degree of Modification

The degree of modification was measured by applying the properties that the modified component adsorbs to a GPC column using silica-based gel as a filler. Using a sample solution containing a sample and low molecular weight internal standard polystyrene, the amount of the sample solution to be adsorbed to the silica-based column was measured from a difference between the chromatogram obtained by measurement using a polystyrene-based gel column and the chromatogram obtained by measurement using a silica column, and the degree of modification was determined.

Preparation of Sample Solution:

10 mg of the sample and 5 mg of standard polystyrene were dissolved in 20 mL of THF to prepare a sample solution.

Condition on GPC Measurement Using Polystyrene-Based Column:

Using THF as an eluent, 200 μL of the sample solution was injected into the apparatus, and measured. The columns used were a guard column: TSKguardcolumn HHR-H made by Tosoh Corporation, and columns: Tosoh Corporation TSKgel G6000 HHR, TSKgel G5000 HHR, and TSKgel G4000 HHR. On the condition of the temperature of the column oven of 40° C. and the flow rate of THF of 1.0 mL/min, the sample solution was measured using an RI detector (HLC8020 made by Tosoh Corporation) to obtain a chromatogram.

Condition on GPC Measurement Using Silica-Based Column:

Using THF as an eluent, 200 μL of the sample was injected into the apparatus, and measured. The columns used were a guard column: DIOL 4.6×12.5 mm, 5 micron, and columns: Zorbax PSM-1000S, PSM-300S, and PSM-60S. At a temperature of the column oven of 40° C. and the flow rate of THF of 0.5 mL/min, measurement was performed using an RI detector in a CCP8020 series built-up type GPC system made by Tosoh Corporation: AS-8020, SD-8022, CCPS, CO-8020, and RI-8021 to obtain a chromatogram.

Method for Calculating Degree of Modification:

The degree of modification (%) was determined from the following equation wherein the total peak area in the chromatogram obtained using the polystyrene-based column was 100, the peak area of the sample was P1, the peak area of the standard polystyrene was P2, the total peak area in the chromatogram obtained using the silica column was 100, the peak area of the sample was P3, and the peak area of the standard polystyrene was P4:

degree of modification (%)=[1−(P2×P3)/(P1×P4)]×100     5

(wherein P1+P2=P3+P4=100)

Example 1

An autoclave having an inner volume of 5 L, equipped with a stirrer and a jacket, and capable of controlling the temperature was used as a reactor. 100 g of 1,3-butadiene, 1900 g of normal hexane, and 1.84 g of 2,2-bis(2-oxolanyl) propane as a polar substance from which impurities were removed in advance were placed in the reactor, and the inner temperature of the reactor was kept at 60° C. As a polymerization initiator, a cyclohexane solution containing 83.4 mmol of n-butyllithium was fed to the reactor. The polymerization progressed substantially at the same temperature, and the peak inner temperature of the reactor was 64° C. 2 minutes later since the reaction temperature reached the peak, 20.9 mmol of 2,2-dimethoxy-1-(3-trimethoxysilylpropyl)-1-aza-2-silacyclopentane was added to the reactor, and a modification reaction was performed at 63° C. for 5 minutes. At this time, the molar ratio of the total amount of a methoxy group bonded to the silyl group in the added modifier to the amount of n-butyllithium to be added was 1.25.

The obtained polymer solution was poured into large amount of methanol, and a precipitate was separated. For refining, the precipitate was dissolved in normal hexane again, poured into a large amount of methanol, and a precipitate was separated. This operation was repeated twice. Subsequently, the precipitate was dried by a vacuum dryer for 6 hours to obtain a modified butadiene polymer.

In order to analyze the modified structure in the obtained modified butadiene polymer, the structures of the modified butadiene polymer and the modifier (2,2-dimethoxy-1-(3-trimethoxysilylpropyl)-1-aza-2-silacyclopentane) were analyzed by $^1$H-NMR. Using a nuclear magnetic resonance spectrometer "JNM ECA500" made by JEOL Ltd., the measurement was performed at 500 MHz and room temperature on the condition that the solvent was deuterated chloroform ($CDCl_3$) and tetramethylsilane (TMS) was 0 ppm as a chemical shift standard.

First, 2,2-dimethoxy-1-(3-trimethoxysilylpropyl)-1-aza-2-silacyclopentane was measured by $^1$H-NMR. A signal corresponding to a proton a in following formula (3) was observed in the vicinity of 0.62 ppm. A signal corresponding to a proton b in following formula (3) was observed in the vicinity of 1.58 ppm. A signal corresponding to a proton c in following formula (3) was observed in the vicinity of 1.82 ppm. A signal corresponding to a proton c in following formula (3) was observed in the vicinity of 2.58 ppm. A signal corresponding to a proton d in following formula (3) was observed in the vicinity of 2.79 ppm and 2.83 ppm. Further, a signal corresponding to a proton in the methoxy group was observed in the vicinity of 3.54 ppm. The ratio of the integrated value of the signal of the proton a, the sum of the integrated values of the signals of the protons b and c, and the sum of the integrated values of the signals of the protons d and e was 1:1:1.

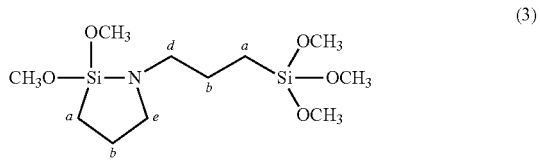

(3)

Next, the modified butadiene polymer was measured by $^1$H-NMR. The signals of the protons b and c in formula (3) overlaid the signal of the proton in the butadiene bond unit. For this, the protons b and c could not be clearly recognized. The signal of the proton e disappeared. As a result, the area ratio of the signal of the proton d to the signal of the proton a was 1:1. From this, it was found out that the Si—N bond in formula (3) was cleaved, and a modifying group was introduced as shown in above formula (2). Moreover, in the residue of n-butyllithium as the initiator in the vicinity of 0.87 ppm, the ratio of the integrated value of the signal of the methyl group bonded to the initiating end of the polymer to the integrated value of the signal of the proton a was approximately 3:1. From this, it was found out that four molecular chains were bonded to the modifier.

Example 2

An autoclave having an inner volume of 10 L, equipped with a stirrer and a jacket, and capable of controlling the temperature was used as a reactor. 777 g of 1,3-butadiene, 273 g of styrene, 4800 g of cyclohexane, and 1.45 g of 2,2-bis(2-oxolanyl)propane as the polar substance from which impurities were removed in advance were placed in the reactor, and the inner temperature of the reactor was kept at 42° C. As the polymerization initiator, a cyclohexane solution containing 15.1 mmol of n-butyllithium was fed to the reactor. After the polymerization reaction was started, the temperature within the reactor started to be raised by the heat generated by the polymerization, and finally reached 80° C. 2 minutes later since the reaction temperature reached the peak, 2.72 mmol of 2,2-dimethoxy-1-(3-trimethoxysilylpropyl)-1-aza-2-silacyclopentane was added to the reactor, and the modification reaction was performed at 75° C. for 5 minutes. At this time, the molar ratio of the total amount of the methoxy group bonded to the silyl group in the added modifier to the amount of n-butyllithium to be added was 0.9.

2.1 g of an antioxidizing agent (2,6-di-tert-butyl-4-hydroxytoluene; BHT) was added to the polymer solution, and the solvent was removed by steam stripping, and the resulting polymer was dried by a dryer to obtain a styrene-butadiene copolymer having a modified component (modified conjugated diene-based polymer; Sample A).

As a result of analyzing Sample A, the bound styrene content was 26% by mass, and the bound butadiene content was 74%. The Mooney viscosity at 100° C. was 62. The vinyl linkage content (1,2-linkage content) of the microstructure of the butadiene portion determined from the result of the measurement using an infrared spectrophotometer by calculation according to the Hampton method was 56%. The degree of modification was 95%. The result of analysis of Sample A is shown in Table 1.

Example 3

An autoclave having an inner volume of 10 L, equipped with a stirrer and a jacket, and capable of controlling the temperature was used as a reactor. 777 g of 1,3-butadiene, 273 g of styrene, 4800 g of cyclohexane, and 1.48 g 2,2-bis(2-oxolanyl)propane as the polar substance from which impurities were removed in advance were placed in the reactor, and the inner temperature of the reactor was kept at 42° C. As the polymerization initiator, instead of n-butyllithium, 15.4 mmol of lithium pyrrolidide obtained by reacting n-butyllithium with an equimolar amount of pyrrolidine in advance was fed to the reactor as a cyclohexane solution. After the polymerization reaction was started, the temperature within the reactor started to be raised by the heat generated by the polymerization, and finally reached 78° C. 2 minutes later since the reaction temperature reached the peak, 2.77 mmol of 2,2-dimethoxy-1-(3-trimethoxysilylpropyl)-1-aza-2-silacyclopentane was added to the reactor, and the modification reaction was performed at 75° C. for 5 minutes. At this time, the molar ratio of the total amount of the methoxy group bonded to the silyl group in the added modifier to the amount of lithium pyrrolidide to be added was 0.9.

2.1 g of the antioxidizing agent (BHT) was added to the polymer solution, and the solvent was removed by steam stripping, and the resulting polymer was dried by a dryer to obtain a styrene-butadiene copolymer having a modified component (modified conjugated diene-based polymer; Sample B). The result of analysis of Sample B is shown in Table 1.

Comparative Example 1

An autoclave having an inner volume of 10 L, equipped with a stirrer and a jacket, and capable of controlling the temperature was used as a reactor. 777 g of 1,3-butadiene, 273 g of styrene, 4800 g of cyclohexane, and 1.45 g of 2,2-bis(2-oxolanyl)propane as the polar substance from which impurities were removed in advance, were placed in the reactor, and the inner temperature of the reactor was kept at 42° C. As the polymerization initiator, a cyclohexane solution containing 15.1 mmol of n-butyllithium was fed to the reactor. After the polymerization reaction was started, the temperature within the reactor started to be raised by the heat generated by the polymerization, and finally reached 81° C. 2 minutes later since the reaction temperature reached the peak, instead of 2,2-dimethoxy-1-(3-trimethoxysilylpropyl)-1-aza-2-silacyclopentane, 2.77 mmol of bis(3-trimethoxysilylpropyl)-N-methylamine was added to the reactor, and the modification reaction was performed at 75° C. for 5 minutes. At this time, the molar ratio of the total amount of the methoxy group bonded to the silyl group in the added modifier to the amount of n-butyllithium to be added was 0.9.

2.1 g of the antioxidizing agent (BHT) was added to the polymer solution, and the solvent was removed by steam stripping, and the resulting polymer was dried by a dryer to obtain a styrene-butadiene copolymer having a modified component (modified conjugated diene-based polymer; Sample C). The result of analysis of Sample C is shown in Table 1.

Comparative Example 2

An autoclave having an inner volume of 10 L, equipped with a stirrer and a jacket, and capable of controlling the temperature was used as a reactor. 777 g of 1,3-butadiene, 273 g of styrene, 4800 g of cyclohexane, and 0.63 g of 2,2-bis(2-oxolanyl)propane as the polar substance from which impurities were removed in advance were placed in the reactor, and the inner temperature of the reactor was kept at 42° C. As the polymerization initiator, a cyclohexane solution containing 6.52 mmol of n-butyllithium was fed to the reactor. After the polymerization reaction was started, the temperature within the reactor started to be raised by the heat generated by the polymerization, and finally reached 77° C. 2 minutes later since the reaction temperature reached the peak, instead of 2,2-dimethoxy-1-(3-trimethoxysilylpropyl)-1-aza-2-silacyclopentane, 3.91 mmol of 1-[3-(triethoxysilyl)propyl]-4-methylpiperazine was added to the reactor, and the modification reaction was performed at 75° C. for 5 minutes. At this time, the molar ratio of the total amount of the ethoxy group bonded to the silyl group in the added modifier to the amount of n-butyllithium to be added was 1.8.

2.1 g of the antioxidizing agent (BHT) was added to the polymer solution, and the solvent was removed by steam stripping, and the resulting polymer was dried by a dryer to obtain a styrene-butadiene copolymer having a modified component (modified conjugated diene-based polymer; Sample D). The result of analysis of Sample D is shown in Table 1.

TABLE 1

|  |  |  |  | Example 2 | Example 3 | Comparative Example 1 | Comparative Example 2 |
|---|---|---|---|---|---|---|---|
| Modified conjugated diene-based polymer (Sample No.) |  |  |  | A | B | C | D |
| Polymerization condition | Butadiene |  | (g) | 777 | 777 | 777 | 777 |
|  | Styrene |  | (g) | 273 | 273 | 273 | 273 |
|  | Cyclohexane |  | (g) | 4800 | 4800 | 4800 | 4800 |
|  | Polymerization start temperature |  | (° C.) | 42 | 42 | 42 | 42 |
|  | Polymerization peak temperature |  | (° C.) | 80 | 78 | 81 | 77 |
|  | Polymerization initiator | Kind*[1] |  | NBL | Pr-Li | NBL | NBL |
|  |  | Amount to be added | (mmol) | 15.10 | 15.40 | 15.10 | 6.52 |
|  | Polar substance*[2] | Amount to be added | (g) | 1.45 | 1.48 | 1.45 | 0.63 |
|  | Modifier | Kind*[3] |  | AS-1 | AS-1 | BTMSA | TESMP |
|  |  | Amount to be added | (mmol) | 2.72 | 2.77 | 2.77 | 3.91 |
|  |  | Lithium equivalent ratio*[4] |  | 0.9 | 0.9 | 0.9 | 1.8 |
| Analyzed values | Mooney viscosity (100° C.) |  |  | 62 | 59 | 60 | 58 |
|  | MSR (100° C.) |  |  | 0.59 | 0.60 | 0.63 | 0.99 |
|  | Weight average molecular weight (Mw) |  |  | 389000 | 372000 | 374000 | 357000 |
|  | Number average molecular weight (Mn) |  |  | 326000 | 295000 | 312000 | 279000 |

TABLE 1-continued

|  |  | Example 2 | Example 3 | Comparative Example 1 | Comparative Example 2 |
|---|---|---|---|---|---|
| Mw/Mn |  | 1.19 | 1.26 | 1.20 | 1.28 |
| Bound styrene content | (% by mass) | 26 | 26 | 26 | 26 |
| Vinyl linkage content (1,2-linkage content) | (mol %) | 56 | 55 | 55 | 56 |
| Degree of modification | (%) | 95 | 98 | 94 | 89 |

*[1]NBL: normal butyllithium, Pr-Li: lithium pyrrolidide
*[2]2,2-bis(2-oxolanylpropane)
*[3]AS-1: 2,2-dimethoxy-1-(3-trimethoxysilylpropyl)-1-aza-2-silacyclopentane
BTMSA: bis(3-trimethoxysilylpropyl)-N-methylamine
TESMP: 1-[3-(triethoxysilyl)propyl]-4-methylpiperazine
*[4]the molar ratio of the total amount of the alkoxy group bonded to the silyl group contained in the added modifier to the total amount of the lithium compound to be added Examples 4 and 5, Comparative Examples 3 and 4

Each of the samples shown in Table 1 (Samples A to D) was used as a raw material rubber to obtain a rubber composition containing the raw material rubber according to the blend shown below.

Modified conjugated diene-based polymer (Samples A to D): 100.0 parts by mass
Silica (Ultrasil VN3, made by Evonik Industries AG, nitrogen adsorption specific surface area 175 m²/g): 30.0 parts by mass
Carbon black ("SEAST KH (N339)", made by Tokai Carbon Co., Ltd.): 30.0 parts by mass
Silane coupling agent ("Si75", bis(triethoxysilylpropyl) disulfide, made by Evonik Industries AG): 2.4 parts by mass
S-RAE oil ("JOMO Process NC140", made by JX Nippon Oil & Energy Corporation): 20.0 parts by mass
Zinc oxide: 2.5 parts by mass
Stearic acid: 2.0 parts by mass
Antioxidant (N-isopropyl-N'-phenyl-p-phenylenediamine): 2.0 parts by mass
Sulfur: 1.4 parts by mass
Vulcanization accelerator (N-cyclohexyl-2-benzothiazylsulfinamide): 1.5 parts by mass
Vulcanization accelerator (diphenylguanidine): 1.1 parts by mass
Total: 192.9 parts by mass The above materials were kneaded by the following method to obtain a rubber composition.

An sealed kneader (the inner volume of 0.3 L) including a temperature control apparatus was used. As a first stage of kneading, the raw material rubber (Samples A to D), the fillers (silica, carbon black), the organic silane coupling agent, the process oil, zinc oxide, and stearic acid were kneaded on the condition of a fill factor of 65%, the number of rotation of a rotor of 50/57 rpm. At this time, the temperature of the sealed kneader was controlled to obtain a rubber composition (rubber compound) at a discharge temperature of 155 to 160° C.

Next, as a second stage of kneading, the obtained rubber compound was cooled to room temperature. The antioxidant was added, and the product was again kneaded in order to improve dispersion of silica. In this case, the temperature of the mixer was controlled to adjust the discharge temperature of the rubber compound at 155 to 160° C. After cooling, as a third stage of kneading, sulfur and the vulcanization accelerator were added to the rubber compound, and the product was kneaded by an open roll mill set at 70° C. Subsequently, the obtained product was molded, and vulcanized at 160° C. for 20 minutes by a vulcanizing press. After vulcanization, physical properties of the rubber composition were measured. The measurement result of physical properties is shown in Table 2.

The physical properties of the rubber composition were measured by the following method.

(1) Compound Mooney Viscosity

Using a Mooney viscometer, according to JIS K6300-1, a sample was preheated at 130° C. for 1 minute; and the rotor was rotated 2 turns per minute for 4 minutes, and the viscosity was measured. The Mooney viscosity indicates that processability is higher as the value is smaller.

(2) 300% Modulus, Tensile Strength, Elongation

The tensile strength was measured by the tensile test method according to JIS K6251, and indexed wherein the result of Comparative Example 3 was 100.

(3) Viscoelasticity Parameter

Using a viscoelasticity tester "ARES" made by Rheometric Scientific, Inc., the viscoelasticity parameter was measured in a twist mode. Each of the measured values was indexed wherein Comparative Example 3 was 100. tan δ measured at 0° C., a frequency of 10 Hz, and a strain of 1% was defined as an index of the wet grip performance. It indicates that the wet grip performance is higher as the value is larger. Moreover, tan δ measured at 50° C., a frequency of 10 Hz, and a strain of 3% was defined as an index of fuel efficiency properties. It indicates that fuel efficiency performance is higher as the value is smaller.

(4) Abrasion Resistance

Using an AKRON Abrasion Tester (made by YASUDA SEIKI SEISAKUSHO, LTD.), according to JIS K6264-2, the amount of wear at a load of 44.1 N and the number of rotation of 1000 was measured, and indexed wherein Comparative Example 3 was 100. The abrasion resistance is better as the index is larger.

TABLE 2

|  | Example 4 | Example 5 | Comparative Example 3 | Comparative Example 4 |
|---|---|---|---|---|
| Modified conjugated diene-based polymer (Sample No.) | A | B | C | D |
| Modified conjugated diene rubber Mooney viscosity (100° C.) | 62 | 59 | 60 | 58 |
| Compound Mooney viscosity (130° C.) | 60 | 62 | 59 | 72 |

TABLE 2-continued

|  |  |  | Example 4 | Example 5 | Comparative Example 3 | Comparative Example 4 |
|---|---|---|---|---|---|---|
| Physical properties of vulcanized product | 300% modulus | Index | 99 | 101 | 100 | 101 |
|  | Tensile strength | Index | 101 | 103 | 100 | 103 |
|  | Elongation | Index | 99 | 102 | 100 | 100 |
|  | Abrasion resistance | Index | 102 | 104 | 100 | 109 |
|  | 0° C. tanδ (Strain 1%) | Index | 104 | 108 | 100 | 103 |
|  | 50° C. tanδ (Strain 3%) | Index | 95 | 91 | 100 | 96 |

As shown in Table 2, it was found out that in the modified conjugated diene-based polymer compositions in Examples 4 and 5, tan δ at 50° C. is lower, the hysteresis loss is smaller, the lower rolling resistance of the tire is realized, tan δ at 0° C. is higher, and the wet skid resistance is higher than in the compositions in Comparative Example 3. Moreover, compared to the compositions in Comparative Example 4, it was found out that the Compound Mooney viscosity is lower, and the balance between the processability and the physical properties of the vulcanized product is better. Further, it was found out that the modified conjugated diene-based polymer composition in Examples 4 and 5 have practically sufficient abrasion resistance and breaking strength.

As above, it was found out that the modified conjugated diene-based polymer and modified conjugated diene-based polymer composition according to the present Example has a good balance between the hysteresis loss properties and the wet skid resistance, practically sufficient abrasion resistance and breaking strength, and high processability when the modified conjugated diene-based polymer and modified conjugated diene-based polymer composition are formed into a vulcanized product.

Example 6

Two autoclaves were connected to each other in series, the autoclave having an inner volume of 10 L and the ratio (L/D) of an inner height to a diameter of 4, and having an inlet in the bottom of the autoclave and an outlet on the top thereof, and a stirrer and a jacket for adjusting a temperature. Of the autoclaves, a first autoclave was used as a polymerization reactor, and a second autoclave was used as a modification reactor.

Mixing was performed on the condition of 16.0 g/min of 1,3-butadiene, 8.0 g/min of styrene, and 125.6 g/min of n-hexane from which impurities such as moisture were removed in advance. For impurities deactivation treatment, the mixture was mixed with n-butyllithium at 0.075 mmol/min by a static mixer immediately before the mixture solution was fed to the first reactor, and continuously fed to the bottom of the first reactor. Further, 2,2-bis(2-oxolanyl) propane was fed as the polar substance at the rate of 0.020 g/min, and n-butyllithium was fed as the polymerization initiator at a rate of 0.150 mmol/min to the bottom of the first reactor. The polymerization reaction was continued such that the inner temperature at the outlet of the reactor was 90° C.

A small amount of the polymer solution before the modifier was added was extracted from the outlet of the first reactor, and an antioxidizing agent (BHT) was added to the polymer solution such that the flow rate was 0.2 g per 100 g of the polymer. Then, the solvent was removed, and the Mooney viscosity at 110° C. was measured. The Mooney viscosity at 110° C. was 89.

The temperature of the second reactor was kept at 85° C., and 2,2-dimethoxy-1-(3-trimethoxysilylpropyl)-1-aza-2-silacyclopentane was added as the modifier at a rate of 0.045 mmol/min from the bottom of the second reactor to perform a modified (coupling) reaction. An antioxidizing agent (BHT) was continuously added to a polymer solution flowed from the top of the second reactor at 0.048 g/min (n-hexane solution) so that the flow rate was 0.2 g per 100 g of the polymer, and the modification reaction was completed. Then, the solvent was removed to obtain a modified conjugated diene-based polymer (Sample E).

As the result of analyzing Sample E, the Mooney viscosity at 110° C. was 152. The bound styrene content was 33% by mass, the vinyl linkage content (1,2-linkage content) in butadiene bond units was 38 mol %, the glass transition temperature measured by DSC was −25° C., and the degree of modification was 66%. The result of analysis of Sample E is shown in Table 3.

Example 7

A modified conjugated diene-based polymer (Sample F) was obtained in the same manner as in Example 6 except that the amount of 2,2-dimethoxy-1-(3-trimethoxysilylpropyl)-1-aza-2-silacyclopentane to be added as the modifier was 0.0675 mmol/min. The result of analysis of Sample F is shown in Table 3.

Example 8

A modified conjugated diene-based polymer (Sample G) was obtained in the same manner as in Example 6 except that the modifier was changed from 2,2-dimethoxy-1-(3-trimethoxysilylpropyl)-1-aza-2-silacyclopentane to 2-methoxy-2-methyl-1-(3-trimethoxysilylpropyl)-1-aza-2-silacyclopentane, and the amount of the modifier to be added was 0.0563 mmol/min. The result of analysis of Sample G is shown in Table 3.

Example 9

A modified conjugated diene-based polymer (Sample H) was obtained in the same manner as in Example 6 except that the modifier was changed from 2,2-dimethoxy-1-(3-trimethoxysilylpropyl)-1-aza-2-silacyclopentane to 2,2-dimethoxy-1-(4-trimethoxysilylbutyl)-1-aza-2-silacyclohexane. The result of analysis of Sample H is shown in Table 3.

Example 10

A modified conjugated diene-based polymer (Sample I) was obtained in the same manner as in Example 6 except that the amount of 2,2-dimethoxy-1-(3-trimethoxysilylpropyl)-1-aza-2-silacyclopentane to be added as the modifier was 0.0225 mmol/min. The result of analysis of Sample I is shown in Table 4.

Comparative Example 5

A modified conjugated diene-based polymer (Sample J) was obtained in the same manner as in Example 6 except that the modifier was changed from 2,2-dimethoxy-1-(3-trimethoxysilylpropyl)-1-aza-2-silacyclopentane to hexachlorodisilane, and the amount of the modifier to be added was 0.0375 mmol/min. The result of analysis of Sample J is shown in Table 4.

Comparative Example 6

A modified conjugated diene-based polymer (Sample K) was obtained in the same manner as in Example 6 except that the modifier was changed from 2,2-dimethoxy-1-(3-trimethoxysilylpropyl)-1-aza-2-silacyclopentane to 1,2-bis(3-triethoxysilyl)ethane, and the amount of the modifier to be added was 0.0375 mmol/min. The result of analysis of Sample K is shown in Table 4.

Comparative Example 7

A modified conjugated diene-based polymer (Sample L) was obtained in the same manner as in Example 6 except that the modifier was changed from 2,2-dimethoxy-1-(3-trimethoxysilylpropyl)-1-aza-2-silacyclopentane to 1,2-bis(3-triethoxysilyl)octane, and the amount of the modifier to be added was 0.0375 mmol/min. The result of analysis of Sample L is shown in Table 4.

Comparative Example 8

A modified conjugated diene-based polymer (Sample M) was obtained in the same manner as in Example 6 except that the modifier was changed from 2,2-dimethoxy-1-(3-trimethoxysilylpropyl)-1-aza-2-silacyclopentane to bis(3-trimethoxysilylpropyl)-N-methylamine, and the amount of the modifier to be added was 0.0375 mmol/min. The result of analysis of Sample M is shown in Table 5.

Comparative Example 9

A modified conjugated diene-based polymer (Sample N) was obtained in the same manner as in Example 6 except that the amount of n-butyllithium to be added as the polymerization initiator was 0.120 mmol/min, the amount of 2,2-bis(2-oxolanyl)propane to be added was 0.018 g/min, the modifier was changed from 2,2-dimethoxy-1-(3-trimethoxysilylpropyl)-1-aza-2-silacyclopentane to 1-[3-(triethoxysilyl)propyl]-4-methylpiperazine, and the amount of the modifier to be added was 0.130 mmol/min. The result of analysis of Sample N is shown in Table 5.

Comparative Example 10

A modified conjugated diene-based polymer (Sample O) was obtained in the same manner as in Comparative Example 9 except that the modifier was changed from 1-[3-(triethoxysilyl)propyl]-4-methylpiperazine to N-methyl-aza-2,2-dimethoxysilacyclopentane. The result of analysis of Sample O is shown in Table 5.

TABLE 3

| | | | Example 6 | Example 7 | Example 8 | Example 9 |
|---|---|---|---|---|---|---|
| Modified conjugated diene-based polymer (Sample No.) | | | E | F | G | H |
| Polymerization condition | Butadiene | (g/min) | 16.0 | 16.0 | 16.0 | 16.0 |
| | Styrene | (g/min) | 8.0 | 8.0 | 8.0 | 8.0 |
| | n-Hexane | (g/min) | 125.6 | 125.6 | 125.6 | 125.6 |
| | Polymerization temperature | (° C.) | 90 | 90 | 90 | 90 |
| | n-Butyllithium for treatment | (mmol/min) | 0.075 | 0.075 | 0.075 | 0.075 |
| | n-Butyllithium for polymerization initiator | (mmol/min) | 0.150 | 0.150 | 0.150 | 0.150 |
| | Amount of polar substance*[1] to be added | (g/min) | 0.020 | 0.020 | 0.020 | 0.020 |
| | Modifier | Kind of modifier*[2] | AS-1 | AS-1 | AS-2 | AS-3 |
| | | Amount to be added (mmol/min) | 0.0450 | 0.0675 | 0.0563 | 0.0450 |
| | | Lithium equivalent ratio*[3] | 1.0 | 1.5 | 1.0 | 1.0 |
| Analyzed values | Mooney viscosity before modifier is added (110° C.) | | 89 | 89 | 89 | 89 |
| | Mooney viscosity after modified (110° C.) | | 152 | 145 | 141 | 149 |
| | MSR (110° C.) | | 0.174 | 0.192 | 0.265 | 0.209 |
| | Weight average molecular weight | | 938000 | 912000 | 842000 | 883000 |
| | Number average molecular weight | | 425000 | 419000 | 374000 | 391000 |
| | Mw/Mn | | 2.21 | 2.18 | 2.25 | 2.26 |
| | Bound styrene content | (% by mass) | 33 | 33 | 33 | 33 |
| | Vinyl linkage content (1,2-linkage content) | (mol %) | 38 | 38 | 38 | 38 |
| | Glass transition temperature | (° C.) | −25 | −25 | −25 | −25 |
| | Degree of modification*[4] | (%) | 66 | 65 | 64 | 63 |

TABLE 4

|  |  |  | Example 10 | Comparative Example 5 | Comparative Example 6 | Comparative Example 7 |
|---|---|---|---|---|---|---|
| Modified conjugated diene-based polymer (Sample No.) |  |  | I | J | K | L |
| Polymerization condition | Butadiene | (g/min) | 16.0 | 16.0 | 16.0 | 16.0 |
|  | Styrene | (g/min) | 8.0 | 8.0 | 8.0 | 8.0 |
|  | n-Hexane | (g/min) | 125.6 | 125.6 | 125.6 | 125.6 |
|  | Polymerization temperature | (° C.) | 90 | 90 | 90 | 90 |
|  | n-Butyllithium for treatment | (mmol/min) | 0.075 | 0.075 | 0.075 | 0.075 |
|  | n-Butyllithium for polymerization initiator | (mmol/min) | 0.150 | 0.150 | 0.150 | 0.150 |
|  | Amount of polar substance[*1] to be added | (g/min) | 0.020 | 0.020 | 0.020 | 0.020 |
|  | Modifier Kind of modifier[*2] |  | AS-1 | HCDS | BTESE | BTESO |
|  | Amount to be added | (mmol/min) | 0.0225 | 0.0375 | 0.0375 | 0.0375 |
|  | Lithium equivalent ratio[*3] |  | 0.5 | 1.0 | 1.0 | 1.0 |
| Analyzed values | Mooney viscosity before modifier is added (110° C.) |  | 89 | 86 | 86 | 86 |
|  | Mooney viscosity after modified (110° C.) |  | 131 | 160 | 152 | 131 |
|  | MSR (110° C.) |  | 0.362 | 0.167 | 0.188 | 0.369 |
|  | Weight average molecular weight |  | 786000 | 951000 | 929000 | 772000 |
|  | Number average molecular weight |  | 340000 | 438000 | 418000 | 332000 |
|  | Mw/Mn |  | 2.31 | 2.17 | 2.22 | 2.33 |
|  | Bound styrene content | (% by mass) | 33 | 33 | 33 | 33 |
|  | Vinyl linkage content (1,2-linkage content) | (mol %) | 38 | 38 | 38 | 38 |
|  | Glass transition temperature | (° C.) | -25 | -25 | -25 | -25 |
|  | Degree of modification[*4] | (%) | 58 | — | — | — |

TABLE 5

|  |  |  | Comparative Example 8 | Comparative Example 9 | Comparative Example 10 |
|---|---|---|---|---|---|
| Modified conjugated diene-based polymer (Sample No.) |  |  | M | N | O |
| Polymerization condition | Butadiene | (g/min) | 16.0 | 16.0 | 16.0 |
|  | Styrene | (g/min) | 8.0 | 8.0 | 8.0 |
|  | n-Hexane | (g/min) | 125.6 | 125.6 | 125.6 |
|  | Polymerization temperature | (° C.) | 90 | 90 | 90 |
|  | n-Butyllithium for treatment | (mmol/min) | 0.075 | 0.075 | 0.075 |
|  | n-Butyllithium for polymerization initiator | (mmol/min) | 0.150 | 0.120 | 0.120 |
|  | Amount of polar substance[*1] to be added | (g/min) | 0.020 | 0.018 | 0.018 |
|  | Modifier Kind of modifier[*2] |  | BTMSA | TESMP | MADMSP |
|  | Amount to be added | (mmol/min) | 0.0375 | 0.1300 | 0.1300 |
|  | Lithium equivalent ratio[*3] |  | 1.0 | 2.0 | 1.33 |
| Analyzed values | Mooney viscosity before modifier is added (110° C.) |  | 86 | 115 | 115 |
|  | Mooney viscosity after modified (110° C.) |  | 156 | 122 | 125 |
|  | MSR (110° C.) |  | 0.171 | 0.467 | 0.455 |
|  | Weight average molecular weight |  | 944000 | 717000 | 728000 |
|  | Number average molecular weight |  | 431000 | 372000 | 378000 |
|  | Mw/Mn |  | 2.19 | 1.93 | 1.93 |
|  | Bound styrene content | (% by mass) | 33 | 33 | 33 |
|  | Vinyl linkage content (1,2-linkage content) | (mol %) | 38 | 39 | 39 |
|  | Glass transition temperature | (° C.) | -25 | -25 | -25 |
|  | Degree of modification[*4] | (%) | 58 | 50 | 50 |

[*1] 2,2-bis(2-oxolanyl)propane
[*2] AS-1: 2,2-dimethoxy-1-(3-trimethoxysilylpropyl)-1-aza-2-silacyclopentane
AS-2: 2-methoxy-2-methyl-1-(3-trimethoxysilylpropyl)-1-aza-2-silacyclopentane
AS-3: 2,2-dimethoxy-1-(4-trimethoxysilylbutyl)-1-aza-2-silacyclohexane
HCDS: hexachlorodisilane
BTESE: 1,2-bis(3-triethoxysilyl)ethane
BTESO: 1,2-bis(3-triethoxysilyl)octane
BTMSA: bis(3-trimethoxysilylpropyl)-N-methylamine
TESMP: 1-[3-(triethoxysilyl)propyl]-4-methylpiperazine
MADMSP: N-methyl-aza-2,2-dimethoxysilacyclopentane
[*3] the molar ratio of the total amount of the alkoxy group or chloro group bonded to the silyl group contained in the added modifier to the total amount of n-butyllithium to be added
[*4] The rubber modified with HCDS, BTESE, or BTESO was not adsorbed by the silica column, and the degree of modification could not be measured.

Examples 11 to 15, Comparative Examples 11 to 16

Materials were kneaded in the same manner as in Example 3 except that each of the samples shown in Tables 3 to 5 (Sample E to O) was used as a raw material rubber and blended in the conditions shown below. Thus, rubber compositions containing the respective raw material rubbers were obtained.

Modified conjugated diene-based polymer (Samples E to O): 100.0 parts by mass

Silica (Ultrasil VN3, made by Evonik Industries AG): 75.0 parts by mass

Carbon black (SEAST KH (N339), made by Tokai Carbon Co., Ltd.): 5.0 parts by mass Silane coupling agent (Si75, made by Evonik Industries AG): 6.0 parts by mass S-RAE oil (JOMO Process NC140, made by JX Nippon Oil & Energy Corporation): 42.0 parts by mass Zinc oxide: 2.5 parts by mass Stearic acid: 1.5 parts by mass Antioxidant (N-isopropyl-N'-phenyl-p-phenylenediamine): 2.0 part by mass Sulfur: 2.2 parts by mass Vulcanization accelerator (N-cyclohexyl-2-benzothiazylsulfinamide): 1.7 part by mass Vulcanization accelerator (diphenylguanidine): 2.0 parts by mass Total: 239.9 parts by mass The measurement results of these are shown in Tables 6 to 8. In the physical properties whose result is expressed by an index value, the value in Comparative Example 14 is defined as "100."

TABLE 6

|  |  |  | Example 11 | Example 12 | Example 13 | Example 14 |
|---|---|---|---|---|---|---|
| Modified conjugated diene-based polymer (Sample No.) |  |  | E | F | G | H |
| Modified conjugated diene rubber Mooney viscosity (110° C.) |  |  | 152 | 145 | 141 | 149 |
| Compound Mooney viscosity (130° C.) |  |  | 54 | 51 | 52 | 52 |
| Physical properties of vulcanized product | 300% modulus | Index | 98 | 95 | 99 | 98 |
|  | Tensile strength | Index | 99 | 100 | 105 | 98 |
|  | Elongation | Index | 105 | 103 | 100 | 104 |
|  | Abrasion resistance | Index | 115 | 112 | 108 | 112 |
|  | 0° C. tanδ (Strain 1%) | Index | 112 | 110 | 109 | 109 |
|  | 50° C. tanδ (Strain 3%) | Index | 93 | 89 | 92 | 93 |

TABLE 7

|  |  |  | Modified conjugated diene-based polymer (Sample No.) | | | |
|---|---|---|---|---|---|---|
|  |  |  | Example 15 | Comparative Example 11 | Comparative Example 12 | Comparative Example 13 |
| Modified conjugated diene rubber Mooney viscosity (110° C.) |  |  | I | J | K | L |
| Compound Mooney viscosity (130° C.) |  |  | 131 | 160 | 152 | 131 |
| Physical properties of vulcanized product | 300% modulus | Index | 48 | 61 | 58 | 53 |
|  | Tensile strength | Index | 100 | 104 | 104 | 101 |
|  | Elongation | Index | 101 | 105 | 103 | 109 |
|  | Abrasion resistance | Index | 105 | 99 | 95 | 101 |
|  | 0° C. tanδ (Strain 1%) | Index | 104 | 101 | 97 | 91 |
|  | 50° C. tanδ (Strain 3%) | Index | 96 | 119 | 117 | 120 |

TABLE 8

|  |  |  | Comparative Example 14 | Comparative Example 15 | Comparative Example 16 |
|---|---|---|---|---|---|
| Modified conjugated diene-based polymer (Sample No.) |  |  | M | N | O |
| Modified conjugated diene rubber Mooney viscosity (110° C.) |  |  | 156 | 122 | 125 |
| Compound Mooney viscosity (130° C.) |  |  | 51 | 63 | 66 |
| Physical properties of vulcanized product | 300% modulus | Index | 100 | 102 | 103 |
|  | Tensile strength | Index | 100 | 103 | 101 |
|  | Elongation | Index | 100 | 105 | 102 |
|  | Abrasion resistance | Index | 100 | 103 | 102 |
|  | 0° C. tanδ (Strain 1%) | Index | 100 | 111 | 109 |
|  | 50° C. tanδ (Strain 3%) | Index | 100 | 97 | 97 |

As shown in Tables 6 to 8, it was found out that in the modified conjugated diene-based polymer compositions in Examples 11 to 15, tan δ at 50° C. is lower, the hysteresis loss is smaller, the lower rolling resistance of the tire is realized, tan δ at 0° C. is higher, and the wet skid resistance is higher than in the compositions in Comparative Examples 11 to 16. It was also found out that although the modified conjugated diene rubber has a higher Mooney viscosity, the compound Mooney viscosity is lower, and the balance between the processability and the physical properties of the vulcanized product is better than in the compositions in Comparative Examples 15 and 16. It was further found out that the modified conjugated diene-based polymer compositions in Examples 11 to 15 have practically sufficient abrasion resistance and breaking strength.

This application is based on Japanese Patent Application No. 2010-095310 which was filed with Japan Patent Office on Apr. 16, 2010, which is hereby incorporated by reference herein.

INDUSTRIAL APPLICABILITY

According to the method for producing a modified conjugated diene-based polymer according to the present invention, a modified conjugated diene-based polymer having a good balance between the hysteresis loss properties and the wet skid resistance, practically sufficient abrasion resistance and breaking strength, and high processability when formed into a vulcanized product, can be obtained and the modified conjugated diene-based polymer can be suitably used as a material for a variety of members such as tire treads, footwear, and industrial products.

What is claimed is:

1. A modified conjugated diene-based polymer which comprises two silyl groups having an alkoxy group bonded thereto and which comprises a functional group including a secondary amino group within a molecule, wherein a degree of modification is not less than 50% by mass, the degree of modification being determined by an amount to be adsorbed to a column filled with silica particles by gel permeation chromatography (GPC) measurement using the column, the ratio (Mw/Mn) of the polystyrene equivalent weight average molecular weight (Mw) to the polystyrene equivalent number average molecular weight (Mn) by gel permeation chromatography (GPC) measurement in the modified conjugated diene-based polymer is not less than 1.80 and not more than 3.50, and the Mooney stress-relaxation rate (MSR) of the modified conjugated diene-based polymer measured at 110° C. is not more than 0.35.

2. The modified conjugated diene-based polymer according to claim 1, wherein a polystyrene equivalent number average molecular weight (Mn) of the modified conjugated diene-based polymer measured by gel permeation chromatography (GPC) is from 200,000 to 600,000.

3. A modified conjugated diene-based polymer composition comprising:
100 parts by mass of a rubber component containing not less than 20 parts by mass of a modified conjugated diene-based polymer according to claim 1, and
0.5 to 300 parts by mass of a silica-based inorganic filler.

4. A modified conjugated diene-based polymer composition comprising:
100 parts by mass of a rubber component containing not less than 20 parts by mass of a modified conjugated diene-based polymer according to claim 2, and
0.5 to 300 parts by mass of a silica-based inorganic filler.

5. A modified conjugated diene-based polymer composition comprising:
100 parts by mass of a rubber component containing not less than 20 parts by mass of a modified conjugated diene-based polymer according to claim 1, and
0.5 to 300 parts by mass of a silica-based inorganic filler.

* * * * *